(12) United States Patent
Obaidat et al.

(10) Patent No.: US 10,854,395 B1
(45) Date of Patent: Dec. 1, 2020

(54) ASYMMETRIC SUPERCAPACITOR WITH HIERARCHICAL ELECTRODES

(71) Applicant: UNITED ARAB EMIRATES UNIVERSITY, Al Ain (AE)

(72) Inventors: Ihab M. Obaidat, Al Ain (AE); Hee-Je Kim, Busan (KR); Chandu V. V. Muralee Gopi, Busan (KR); Sambasivam Sangaraju, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 16/926,730

(22) Filed: Jul. 12, 2020

(51) Int. Cl.
*H01G 11/26* (2013.01)
*H01G 11/46* (2013.01)
*H01G 11/36* (2013.01)

(52) U.S. Cl.
CPC ............. *H01G 11/26* (2013.01); *H01G 11/36* (2013.01); *H01G 11/46* (2013.01)

(58) Field of Classification Search
CPC ........ H01G 11/26; H01G 11/36; H01G 11/46; H01G 11/24; H01G 11/28; H01G 11/48; H01G 11/70; H01G 11/86; C01B 32/158; B82Y 30/00; Y02E 60/13
See application file for complete search history.

(56) References Cited

U.S. PATENT DOCUMENTS

| 2014/0362495 | A1 | 12/2014 | Brandon et al. |
| 2018/0010260 | A1 | 1/2018 | Hersam et al. |
| 2019/0057819 | A1 | 2/2019 | Gedela |
| 2019/0237269 | A1* | 8/2019 | Fan ......................... H01G 11/08 |
| 2020/0091501 | A1* | 3/2020 | Liu .......................... H01G 11/46 |
| 2020/0099054 | A1* | 3/2020 | Liu ...................... H01M 4/5815 |

FOREIGN PATENT DOCUMENTS

| CN | 103337604 A | 10/2013 |
| CN | 104393244 A | 3/2015 |
| CN | 105514365 A | 4/2016 |
| CN | 108899507 A | 11/2018 |
| CN | 109524657 A | 3/2019 |

OTHER PUBLICATIONS

Gopi, C. V. M., Vinodh, R., Sambasivam, S., Obaidat, I. M., Singh, S., & Kim, H. J. (2020). $Co_9S_8$—$Ni_3S_2$/$CuMn_2O_4$—$NiMn_2O_4$ and $MnFe_2O_4$—$ZnFe_2O_4$/graphene as binder-free cathode and anode materials for high energy density supercapacitors. Chemical Engineering Journal, 381, 122640.

* cited by examiner

*Primary Examiner* — Michael P McFadden

(74) *Attorney, Agent, or Firm* — Nath, Goldberg & Meyer; Richard C. Litman

(57) ABSTRACT

Hierarchical nanostructured cathode and anode are provided for an asymmetric supercapacitor, with the cathode including $Co_9S_8$—$Ni_3S_2$ nanoparticles anchored on $CuMn_2O_4$—$NiMn_2O_4$ nanosheet arrays and the anode including rhombus-like shaped $MnFe_2O_4$—$ZnFe_2O_4$ nanocrystals grown on a graphene-ink coated Ni foam. The asymmetric supercapacitor with the cathode and anode exhibits a large operating window, high energy density, and high cycling stability.

6 Claims, 28 Drawing Sheets

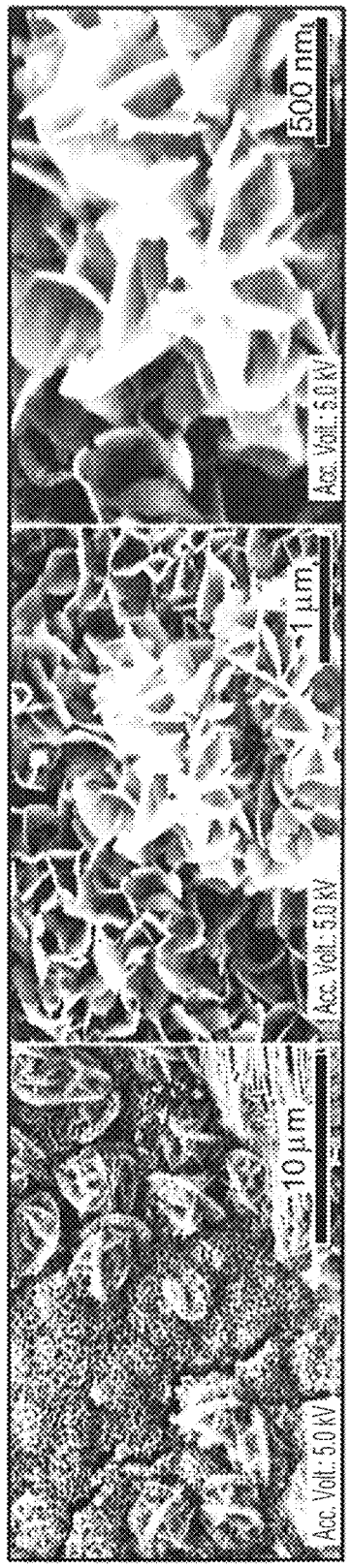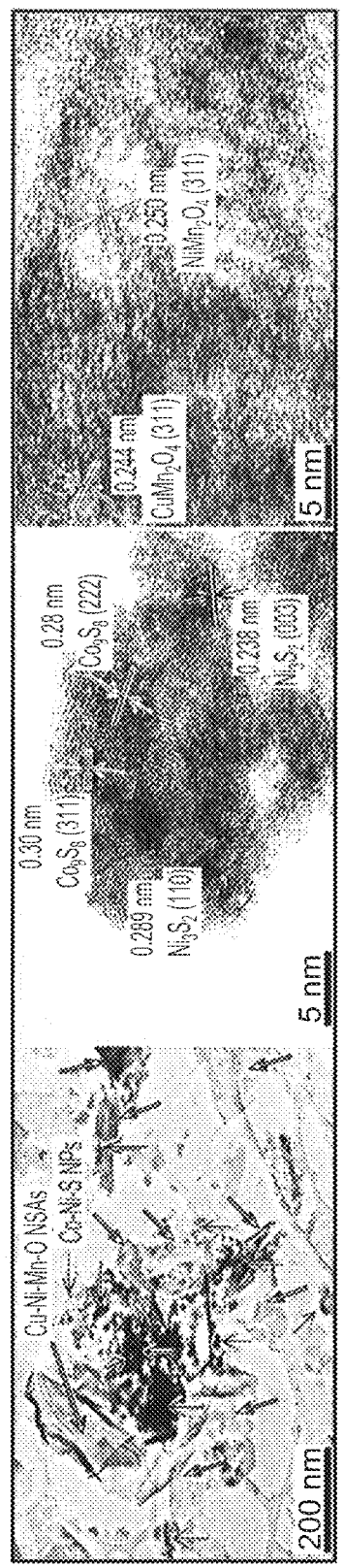

FIG. 4B  FIG. 4C  FIG. 4D  FIG. 4E  FIG. 4F  FIG. 4G

ASYMMETRIC SUPERCAPACITOR WITH HIERARCHICAL ELECTRODES

BACKGROUND

1. Field

The disclosure of the present patent application relates generally to supercapacitors. More specifically, the disclosure relates to a high energy density asymmetric supercapacitor (ASC) with a binder-free cathode and a binder-free anode.

2. Description of the Related Art

Supercapacitors (SC) have advantageous features for energy storage, including rapid charge-discharge rates, high power density and outstanding cycling performance. However, conventional SCs deliver lower energy density than rechargeable batteries, limiting their commercialization. Energy density E relates to capacitance C and operating potential window V according to the equation $E=0.5CV^2$. Energy density could therefore be increased by optimizing either the operating potential window or capacitance.

Some attempts have been made to develop asymmetric supercapacitors (ASCs) or hybrid supercapacitors (HSCs) with battery-type cathode and carbon-based anode materials to provide improved energy and power density. Various cathode materials, such as NiO, $NiCo_2O_4$, $CO_3O_4$, $Co_2MnO_4$, $NiMn_2O_4$, Ni—Co layered double hydroxide (LDH), CoAl LDH, $CoNi_2S_4$, and $CoNiSe_2$, have proven to be promising positive electrodes for ASCs due to their fast faradaic redox reactions and high theoretical capacity. In addition, among various transition metal sulfides, both $Ni_3S_2$ and $Co_9S_8$ have excellent electrochemical performance. However, ASCs with cathodes made of single metal oxide or metal sulfide materials suffer from poor electrical conductivity, low energy density, and unsatisfactory cycling life. Hybrid composite materials provide potentially improved electrochemical activity, electrical conductivity and synergetic effects between the electrode material components. As a result, various composite materials, such as $Ni_3S_2@Co(OH)_2$, $NiS_2@NiMoO_4$, $NiO—Co_3O_4—NiO$, $CoFe_2Se_4—CoNiSe_2$, $Ni_3S_2/CoNi_2S_4$, $Co_9Sa/Ni_3S_2$, NiMn $LDH@Co_3O_4$, and 3D $Ni_3Se_2@Ni(OH)_2$, have been studied.

The design and development of unique and novel anode materials are also crucial for improved ASCs performance. Generally, carbon materials have been commonly used as anode materials for ASCs, due to their outstanding cycling behavior and good power density. However, carbon-based anode materials can be associated with low energy density. Various alternative negative electrode materials, such as $V_2O_5$, $Fe_2O_3$, $MoO_3$, $ZnFe_2O_4$, $MnFe_2O_4$, have been studied for their potential to enhance the energy density of ASCs. Among them, $ZnFe_2O_4$ and $MnFe_2O_4$ materials, in particular, have advantages of low cost, abundance, high-theoretical capacitance and excellent electrochemical performance. However, $ZnFe_2O_4$ and $MnFe_2O_4$ materials have low surface area and poor electrical conductivity. Effective and economically viable anode materials for ASCs, without compromising the energy density and cycling behavior, are needed.

ASCs synthesized with hybrid anode and cathode materials solving the aforementioned problems are therefore desired.

SUMMARY

An asymmetric supercapacitor can include a binder-free cathode and an anode with hierarchical nanostructured composite materials. In particular, the cathode includes both a composite metal sulfide ($Co_9S_8—Ni_3S_2$) and a composite metal oxide ($CuMn_2O_4—NiMn_2O_4$). The anode can include spinel ferrites ($MFe_2O_4$; M=Ca, Mg, Cu, Ni, Zn, Mn), and specifically, composite materials comprising spinel ferrites ($MnFe_2O_4—ZnFe_2O_4$) combined with carbon based materials (such as graphene). In an embodiment, the anode material includes $MnFe_2O_4—ZnFe_2O_4$/graphene-ink.

These and other features of the present teachings will become readily apparent upon further review of the following specification.

BRIEF DESCRIPTION OF THE DRAWINGS

FIGS. 1A-1G depict 1(A) a schematic for the method of preparing $Co_9S_9—Ni_3S_2$ nanoparticles (NP) on $CuMn_2O_4$—$NiMn_2O_4$ nanosheet arrays (NSAs) (Co—Ni—S NPs/Cu—Ni—Mn—O NSAs) on a Ni foam surface and 1(B)-1(D) scanning electron microscopy (SEM) images, 1(E) a transmission electron microscopy (TEM) image and 1(F)-1(G) high resolution TEM (HR-TEM) images of Co—Ni—S NPs/Cu—Ni—Mn—O NSAs.

FIGS. 4A-4G depict 4(A) a schematic of the fabrication for rhombus-like Mn—Zn—Fe—O/G-ink nanosheets on a Ni foam surface, and 4(B)-4(D) SEM, 4(E)-4F) TEM and 4(G) HR-TEM images of rhombus-like Mn—Zn—Fe—O/G-ink NS composite electrode.

Similar reference characters denote corresponding features consistently throughout the attached drawings.

DETAILED DESCRIPTION OF THE PREFERRED EMBODIMENTS

Figure 1A:
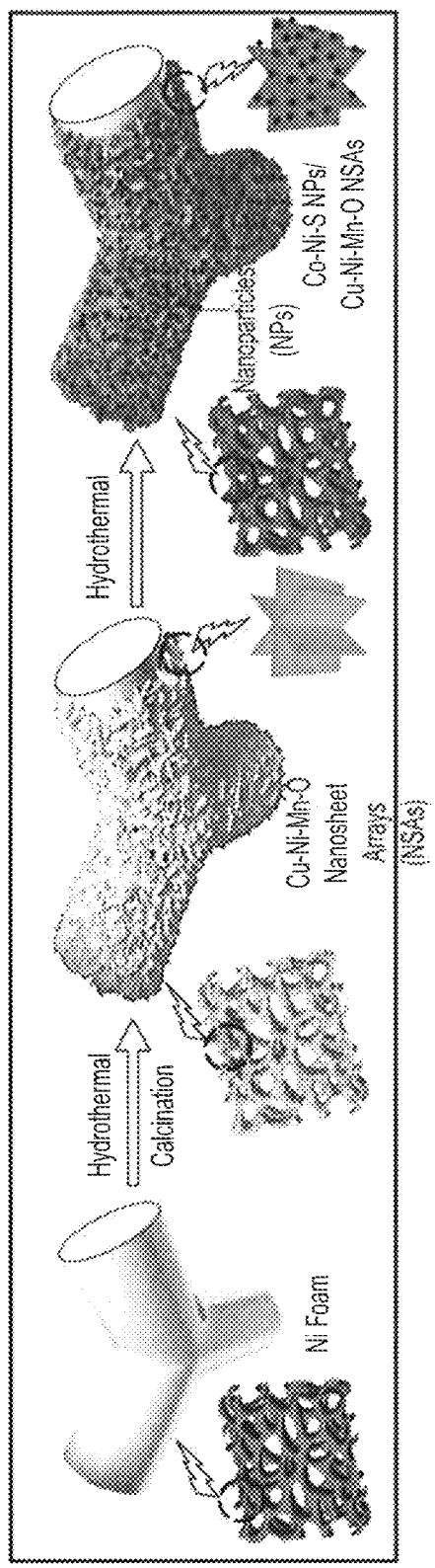

An asymmetric supercapacitor (ASC) can include a binder-free cathode and anode with hierarchical nanostructured composite materials. In particular, the cathode includes both a composite metal sulfide ($Co_9S_8$—$Ni_3S_2$) and a composite metal oxide ($CuMn_2O_4$—$NiMn_2O_4$). The anode can include spinel ferrites ($MFe_2O_4$; M=Ca, Mg, Cu, Ni, Zn, Mn) on a carbon-based material. For example, the anode can include $MnFe_2O_4$—$ZnFe_2O_4$ on graphene-ink nanosheets. The ASC can provide a super high energy density, e.g., 75.65 W h $kg^{-1}$ at 622 W $kg^{-1}$, a superior cycling stability, e.g., 96.89% retention with 98.26% columbic efficiency over 5000 cycles, and a large operating potential window, e.g., 1.6 V.

An embodiment of the present subject matter includes an ASC having a cathode comprising $Co_9S_8$—$Ni_3S_2$/$CuMn_2O_4$—$NiMn_2O_4$. For example, the cathode can include $Co_9S_8$—$Ni_3S_2$ in the form of nanoparticles on $CuMn_2O_4$—$NiMn_2O_4$ nanosheet arrays. An embodiment of the present subject matter includes an ASC having an anode material comprising Mn—Zn—Fe—O nanocrystals on graphene-ink nanosheets.

According to an embodiment, the cathode material can be fabricated by mixing $Cu(NO_3)_2 \cdot H_2O$, $Ni(NO_3)_2 \cdot H_2O$, $Mn(NO_3)_2 H_2O$, $NH_4F$ and $CH_4N_2O$ in water to form a reaction solution, immersing a substrate, such as a Ni foam substrate, in the solution and heating the substrate in the solution to form a $CuMn_2O_4$—$NiMn_2O_4$ material-loaded Ni foam. The $CuMn_2O_4$—$NiMn_2O_4$ material-loaded Ni foam can be removed from the solution, dried, then heated again. Then, $Co(NO_3)_2 \cdot H_2O$, $Ni(NO_3)_2 \cdot H_2O$ and $CH_4N_2S$ can be mixed in water to form a second solution. The $CuMn_2O_4$—$NiMn_2O_4$ material-loaded Ni foam can be immersed in the second solution and heated. The $CuMn_2O_4$—$NiMn_2O_4$ material-loaded Ni foam can then be removed from the second solution, dried, then heated again to form Co—Ni—S NPs/Cu—Ni—Mn—O nanosheet arrays (NSAs).

According to an embodiment the anode can be prepared by depositing graphene on a substrate by, for example, brushing graphene in liquid solution (such as a graphene ink) on the substrate and allowing to dry. For example, graphene ink can be applied to a Ni foam substrate to form a G-ink coated Ni foam. Afterwards, $MnFe_2O_4$—$ZnFe_2O_4$ nanocrystals may be grown on the graphene via a hydrothermal reaction followed by calcination. For example, $Mn(NO_3)_2 \cdot H_2O$, M $Zn(NO_3)_2 \cdot H_2O$, M $Fe(NO_3)_2 \cdot H_2O$, $NH_4F$ and $CH_4N_2O$ can be mixed in water and loaded on to the G-ink coated Ni foam in a 100 mL Teflon autoclave reactor. After heating in the autoclave, the samples can be removed, washed with water, dried in an oven, and then annealed to provide the anode including $MnFe_{24}$—$ZnFe_2O_4$/G-ink (hereinafter, Mn—Zn—Fe—O/G-ink).

The asymmetric super capacitor exhibits particularly advantageous electrical properties. The hierarchical structure of the cathode and anode materials, and the particular components making up that structure result in large surface area, high conductivity and provide rich active sites for redox reactions. In particular, the cathode and anode each exhibit high specific capacities, rate capabilities and cycling stability. The ASC comprising said cathode and anode materials, respectively, has a large operating window, delivers high energy and power densities and exhibits high cycling stability.

A hierarchical nanostructure is an integrated architecture comprising nanoscale or low dimensional sub-units, including, for example, zero dimensional (0D) nanoparticles, one dimensional (1D) nanowires or nanotubes, and two dimensional (2D) nanosheets, in which these sub-units may be aligned in a well ordered fashion.

Nanostructures refer to materials having a dimension of a scale ranging from 1 to 1000 nm. For example, a nanosheet is a nanostructure with at least one nanoscale dimension (thickness), i.e., a thickness in a scale ranging from 1 to 1000 nm. A nanoparticle is a nanostructure with all three dimensions being nanoscale.

It should be understood that the amounts of materials for the methods described herein are exemplary, and appropriate scaling of the amounts are encompassed by the present subject matter, as long as the relative ratios of materials are maintained. As used herein, the term "about," when used to modify a numerical value, means within ten percent of that numerical value.

The present teachings are illustrated by the following examples.

EXAMPLES

Example 1

Synthesis of Exemplary Cathode Material

Synthesis of Cu—Ni—Mn—O NSAs:

Exemplary Cu—Ni—Mn—O NSAs were hydrothermally synthesized. A piece of Ni foam (2×2 $cm^2$) was ultrasonically pre-treated sequentially in 3 M HCl, ethanol and then distilled (DI) water for 10 min each to eliminate unwanted impurities. Then, 0.05 M $Cu(NO_3)_2 \cdot 6H_2O$, 0.05 M $Ni(N_3)_2 \cdot 6H_2O$, 0.1 M $Mn(NO_3)_2 \cdot 6H_2O$, 0.12 M $NH_4F$ and 0.24 M $CH_4N_2O$ were mixed in 70 mL. DI water and stirred for 30 min to form a reaction solution. The pre-treated Ni foam was loaded into a 100 mL Teflon autoclave reactor filled with the reaction solution and autoclaved at 100° C. for 10 h to produce a $CuMn_{24}$—$NiMn_2O_4$ material-loaded Ni foam ("Cu—Ni—Mn—O NSA"). The $CuMn_{24}$—$NiMn_2O_4$ material-loaded Ni foam was rinsed with DI water, dried at 60° C. overnight and then heated at 200° C. for 2 hours.

Synthesis of Co—Ni—S NPs/Cu—Ni—Mn—O NSAs Cathode Material:

0.05 M $Co(NO_3)_2 \cdot 6H_2O$, 0.05 M $Ni(NO_3)_2 \cdot 6H_2O$ and 0.1 M $CH_4N_2S$ were dissolved in 70 mL DI water under stirring to form a solution. A Teflon-lined autoclave reactor was filled with the solution and the $CuMn_2O_4$—$NiMn_2O_4$ material-loaded Ni foam was loaded into the reactor. The autoclave was maintained at 100° C. for 2 h, and the material-loaded Ni foam was rinsed with DI water and then dried at 60° C. for 12 h to form Co—Ni—S NPs/Cu—Ni—Mn—O NSAs. Exemplary $Co_9S_8$—$Ni_3S_2$ material on bare Ni foam was also fabricated using a similar approach. The $CuMn_2O_4$—$NiMn_2O_4$, $Co_9S_8$—$Ni_3S_2$, and $Co_9S_8$—$Ni_3S_2$/$CuMn_2O_4$—$NiMn_2O_4$ material loaded Ni foams were denoted as Cu—Ni—Mn—O NSAs, Co—Ni—S NPs and Co—Ni—S NPs/Cu—Ni—Mn—O NSAs, respectively, in the following discussion. The loading mass of each of Cu—Ni—Mn—O, Co—Ni—S and Co—Ni—S/Cu—Ni—Mn—O material on Ni foam was estimated to be 2.3, 1.9 and 2.8 mg cm, respectively.

Example 2

Electrochemical Priorities of Exemplary Cathode Materials

The morphology, crystalline structure, phase purity, elemental valance states, chemical composition and surface area of the as-developed cathode materials were investigated using scanning electron microscopy (SEM, S-4800), transmission electron microscopy (TEM), high-resolution TEM (HR-TEM), X-ray diffraction (XRD, D8 ADVANCE), X-ray photoelectron spectrometer (XPS, ESCALAB 250) and $N_2$ adsorption-desorption technique (ASAP 2020). The SEM, XRD, XPS, TEM and $N_2$ adsorption-desorption measurements were conducted using the above exemplary material-loaded Ni foam, as were additional electrochemical measurements.

Presumed Fabrication and Electrochemical Properties of the Cathode Material:

FIG. 1A shows the exemplary steps of the fabrication process of the hierarchical Cu—Ni—Mn—O NSAs and Co—Ni—S NPs/Cu—Ni—Mn—O NSAs directly grown on Ni foam using the present two-step hydrothermal reaction. The figure and following description are not particularly limiting. In the first step (described in Example 1), hierarchically structured Cu—Ni—Mn—O NSAs were deposited on the Ni foam surface by a hydrothermal reaction followed by annealing. During the deposition, it is presumed that $NH_4F$ releases $F^-$ ions, which can deliver more active sites for nucleation. During the growth process, it is presumed that the dissolved $Cu(NO_3)_2.6H_2O$, $Ni(NO_3)_2.6H_2O$, $Mn(NO_3)_2.6H_2O$ salts produce nitrate ions ($NO_3$), which are gradually reduced on the surface of the Ni foam during the hydrothermal process and release hydroxyl ions ($OH^-$). Meanwhile, urea produces $CO_3^{2-}$ and OH ions in the process of hydrolysis. As a result, the liberated $OH^-$, $Co_3^{2-}$ and $F^-$ ions react with $Cu^{2+}$, $Ni^{2+}$ and $Mn^{2+}$ species, which results in the deposition of $CuMn_2O_4$—$NiMn_2O_4$ nanosheet arrays (Cu—Ni—Mn—O NSAs) onto the Ni foam surface. Subsequently, the Cu—Ni—Mn—O NSAs loaded Ni foam substrates are annealed at 200° C. In the second step (described in Example 2), a simple hydrothermal route resulted in the formation of hierarchical Co—Ni—S nanoparticles on the surface of the Cu—Ni—Mn—O nanosheet arrays, resulting in hybrid Co—Ni—S NPs/Cu—Ni—Mn—O NSAs composite film. Here, $CH_4N_2S$ reacts with $H_2O$ and dissociates to give $H_2S$ and then releases the $S^{2-}$ ions. The ionized $Co^{2+}$ and $Ni^{2+}$ from $Co(NO_3)_2.6H_2O$, and $Ni(NO_3)_2.6H_2O$ in DI water reacts with $S^{2-}$ ions, resulting in the formation of hierarchical $Co_9S_8$—$Ni_3S_2$ nanoparticles anchored on the $CuMn_2O_4$—$NiMn_2O_4$ nanosheet arrays to provide Co—Ni—S NPs/Cu—Ni—Mn—O NSAs.

Surface morphology of the exemplary Co—Ni—S NPs/Cu—Ni—Mn—O NSAs are depicted in FIGS. 1B-1G. As displayed in FIGS. 1B and 1C, the Co—Ni—S NPs are densely deposited on the Cu—Ni—Mn—O NSAs. The high-magnified SEM image in FIG. 1D reveals that the Co—Ni—S NPs homogeneously cover the Cu—Ni—Mn—O NSAs surface. The as-deposited Co—Ni—S NPs on Cu—Ni—Mn—O NSAs may enhance the electrochemical activity, increase surface area, provide abundant electroactive sites and support high ionic mobility, resulting in higher energy storage performance. The TEM image in FIG. 1E shows the Co—Ni—S NPs over the Cu—Ni—Mn—O NSAs surface. The HR-TEM image in FIG. 1F reveals lattice fringe spacing of 0.28 and 0.30 nm ascribed to (222) and (311) planes of $Co_9S_8$ and lattice fringe spacing of 0.238 and 0.289 nm ascribed to (110) and (003) planes of $Ni_3S_2$. From the HR-TEM image in FIG. 1G of the Cu—Ni—Mn—O NSAs, the lattice spacing of 0.244 and 0.250 nm are ascribed to $CuMn_2O_4$ (311) and $NiMn_2O_4$ (311) planes. Moreover, the compositional distributions of Co—Ni—S NPs/Cu—Ni—Mn—O NSAs were examined by elemental mapping analyses, in which the existence and uniform distributions of Cu, Ni, Mn, O, Co and S are clearly identified in the hybrid Co—Ni—S NPs/Cu—Ni—Mn—O NSAs composite film.

Figure 2A:
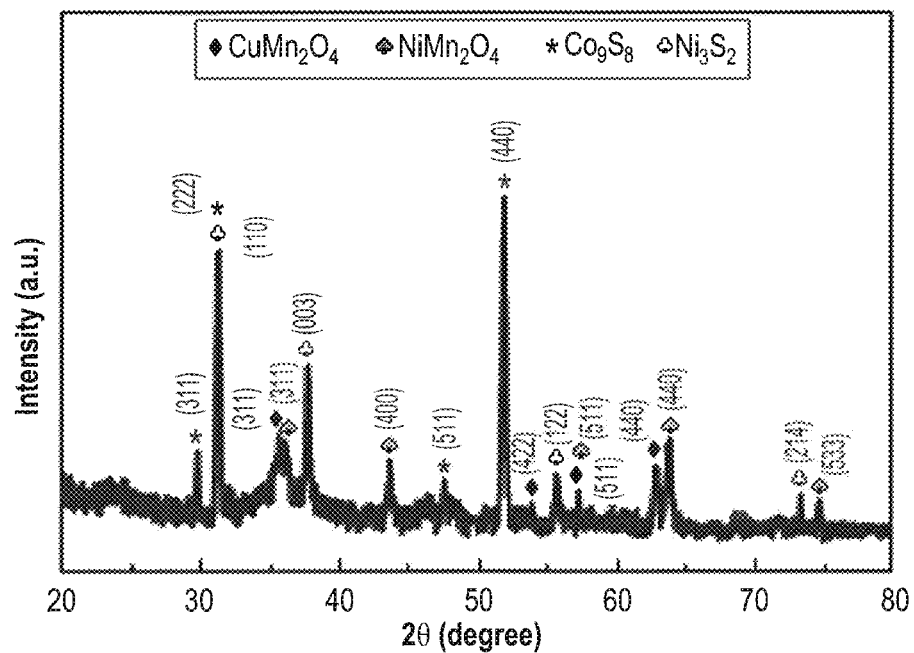
FIGS. 2A-2I depict 2(A) the x-ray diffraction (XRD) pattern, 2(B) the X-ray photoelectron spectroscopy (XPS) spectrum, 2(C)-2(H) high-resolution XPS analysis of the Co—Ni—S NPs/Cu—Ni—Mn—O NSAs electrode on a Ni foam surface, and 2(I) $N_2$ adsorption-desorption isotherms of as-prepared electrodes (inset shows the pore size distribution plots of the electrodes).
Figure 2B:
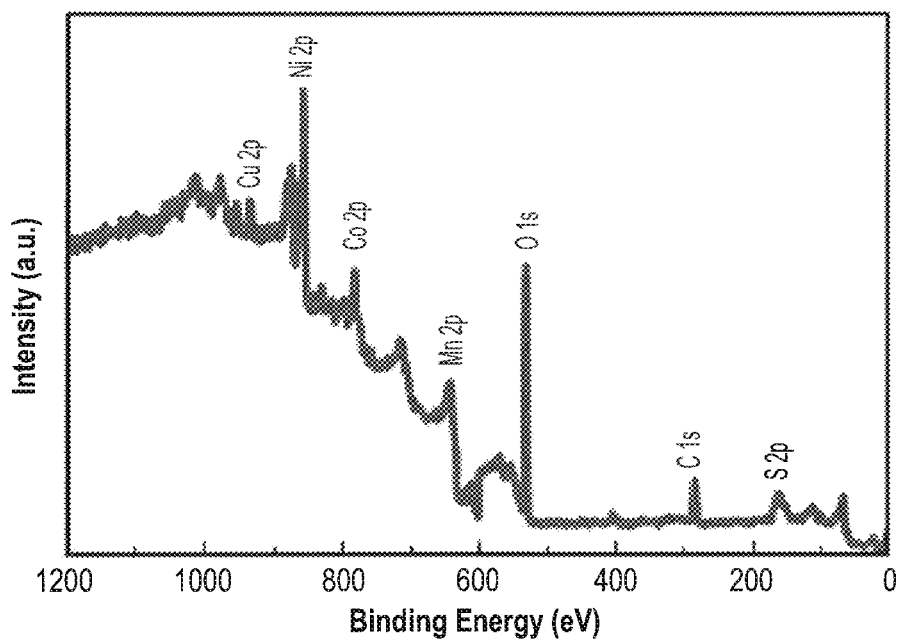
Figure 2C:
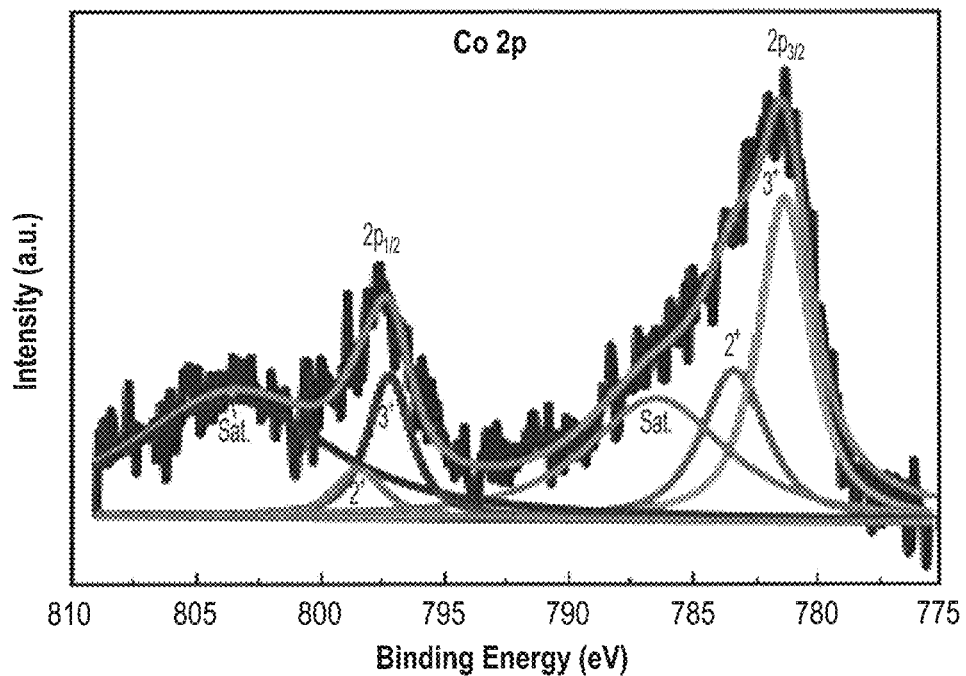
Figure 2D:
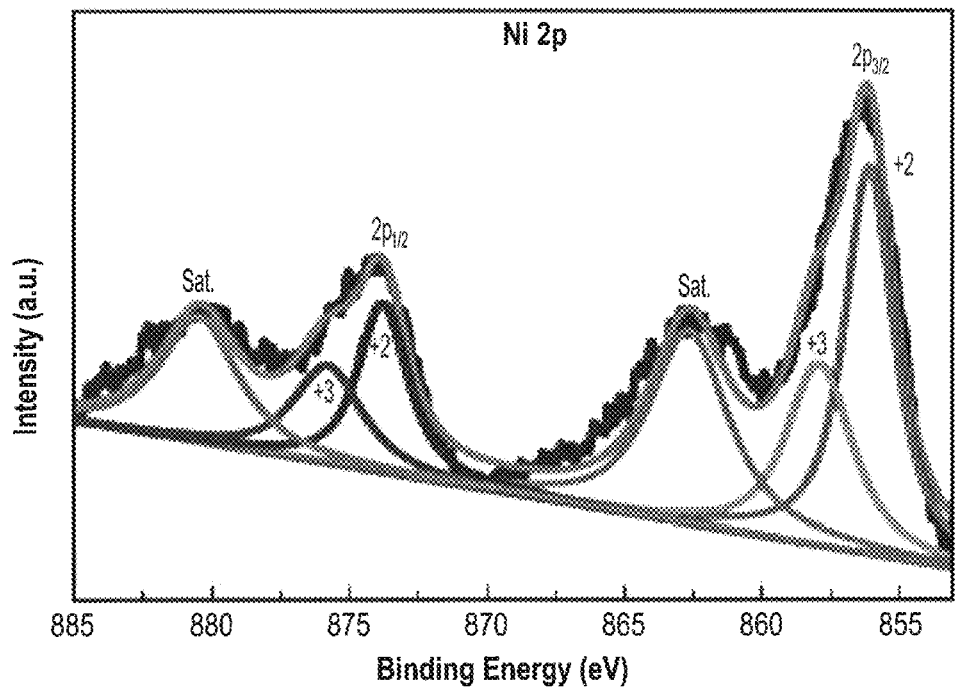
Figure 2E:
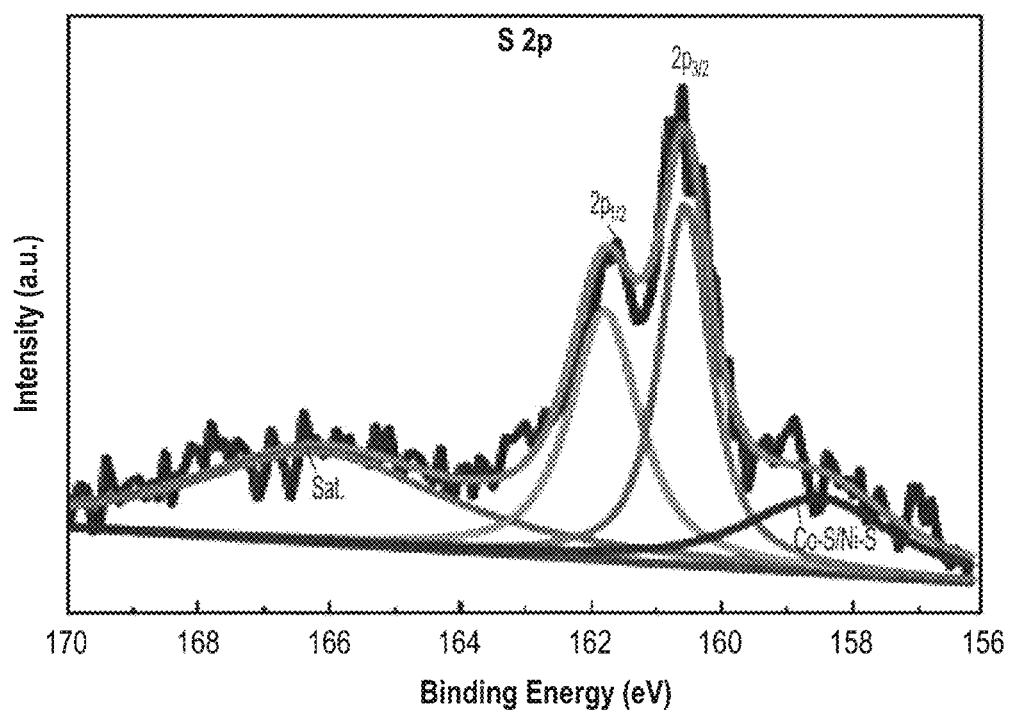
Figure 2F:
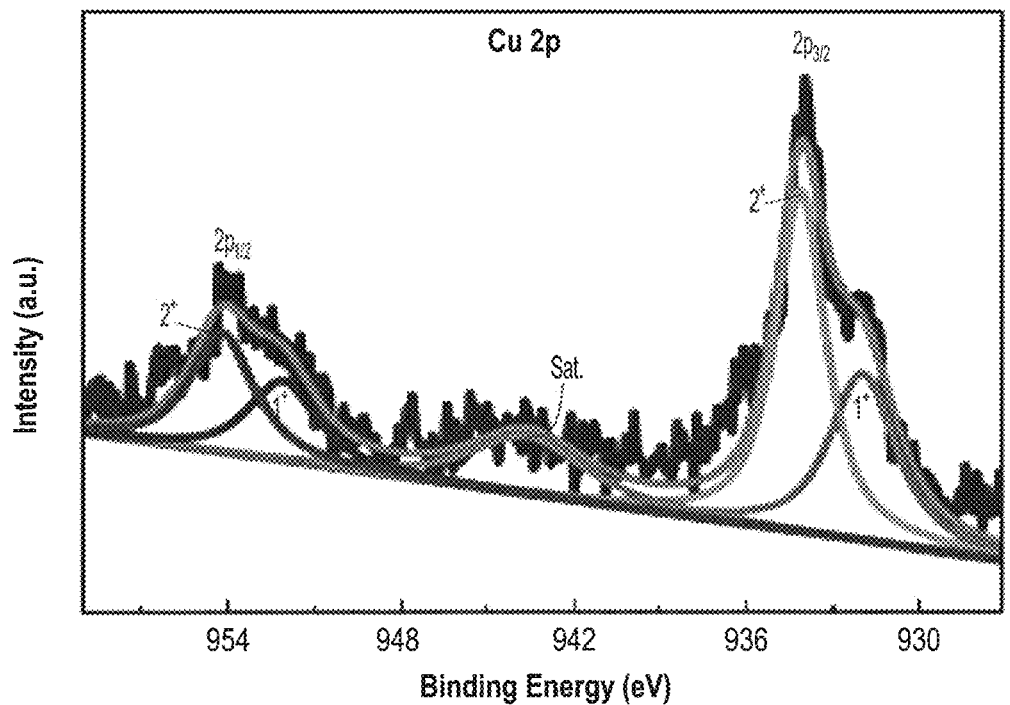
Figure 2G:
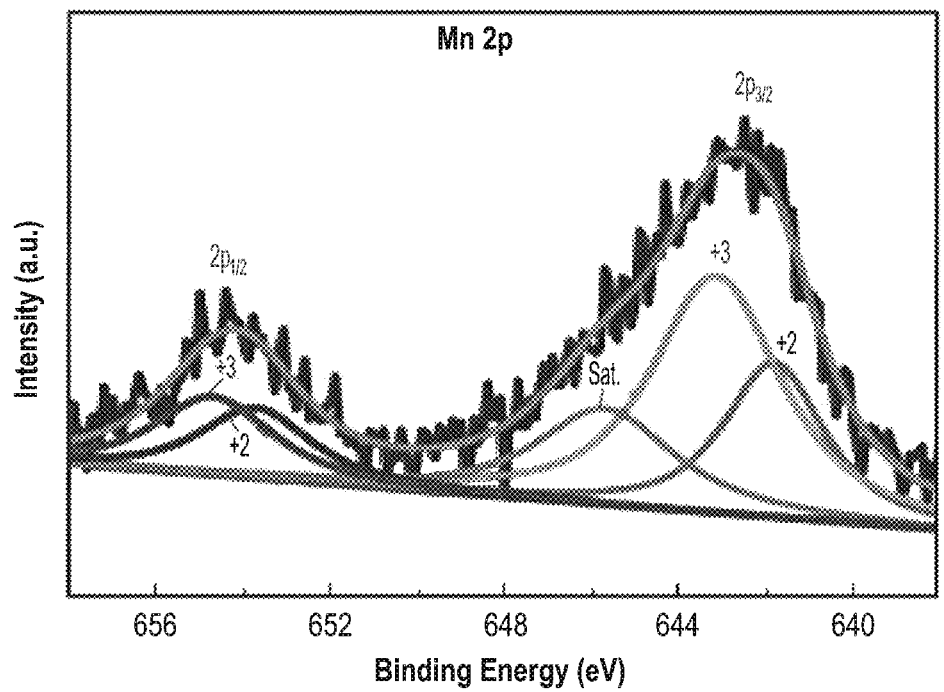
Figure 2H:
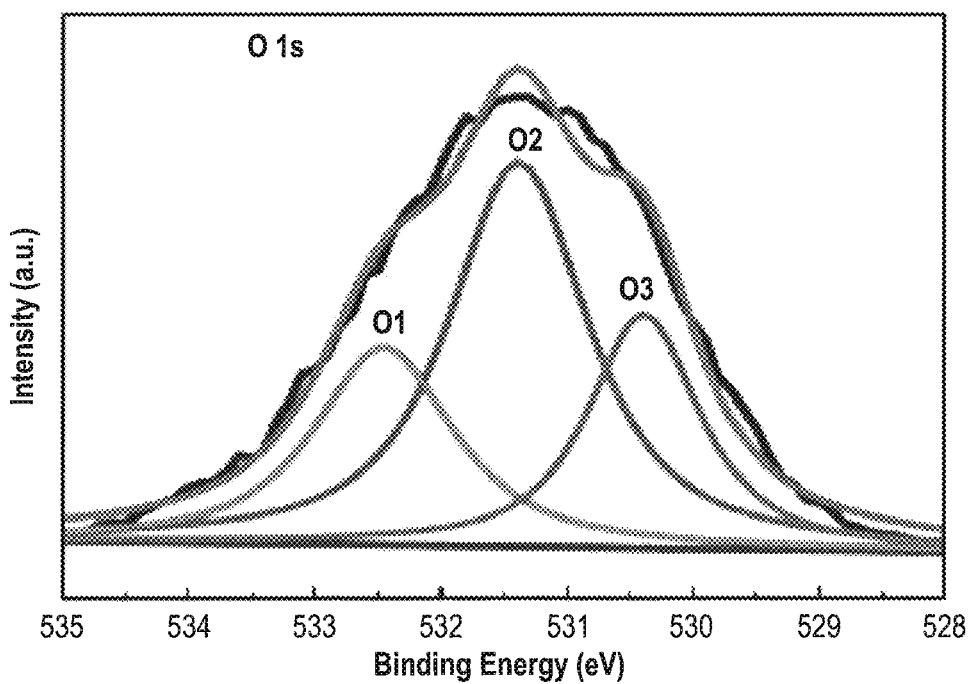
Figure 2I:
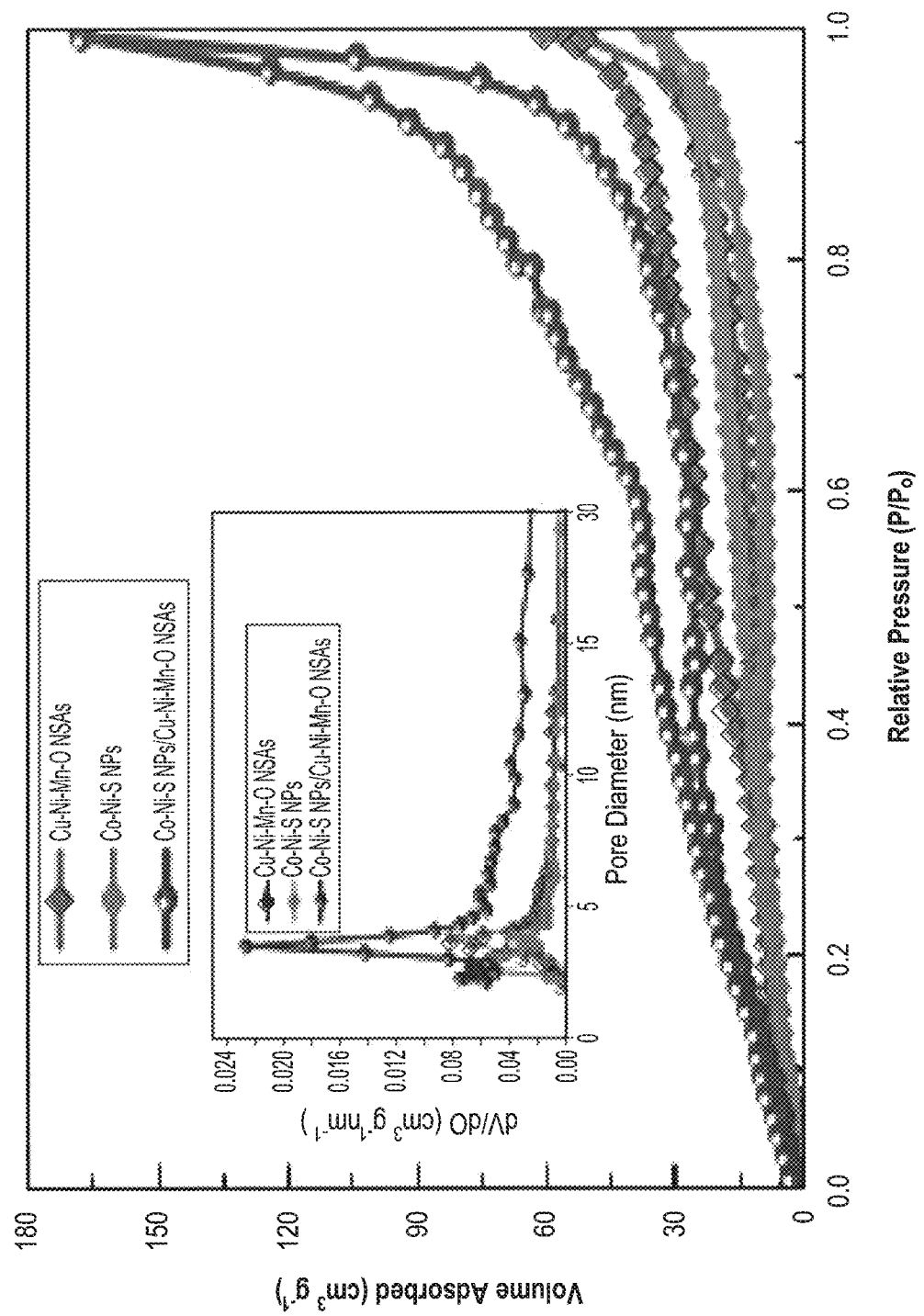

XRD and XPS results depicted in FIGS. 2A-2H elucidate the phase composition, elemental composition and valence state of the as-prepared Co—Ni—S NPs/Cu—Ni—Mn—O NSAs. The corresponding diffraction peaks can be accordingly indexed to the $Co_8S_7$ phase (Joint Committee on Powder Diffraction Standards (JCPDS) no. 65-6801), heazlewoodite $Ni_3S_2$ phase (JCPDS no. 44-1418), $CuMn_2O_4$ spinel structure (JCPDS no. 34-1400) and $NiMn_2O_4$ patterns (JCPDS no. 71-0852) without any additional peaks, confirming the coexistence phases of $Co_9S_8$, $Ni_3S_2$, $CuMn_2O_4$ and $NiMn_2O_4$ in hybrid Co—Ni—S NPs/Cu—Ni—Mn—O NSAs sample. The XPS survey spectrum of the hybrid composite sample (FIG. 2B) confirms the presence of Cu 2p, Ni 2p, Co 2p, Mn 2p, O 1s, S 2p and C s signals originating from nanoparticles Co—Ni—S/Cu—Ni—Mn—O nanosheet arrays film, which is consistent with the elemental mapping findings. For Co 2p spectrum shown in FIG. 2C, the Co $2p_{3/2}$ (≈781.35 eV for $Co^{3+}$ and ≈783.37 eV for $Co^{2+}$) and Co $2p_{1/2}$ (≈797.2 eV for $Co^{3+}$ and ≈798.42 eV for $Co^{2+}$) peaks accompanied with the other two broad satellite peaks indicate the presence of $Co^{2+}$ and $Co^{3+}$ states. In the Ni 2p high-resolution spectrum (FIG. 2D), the fitting peaks at 856.11 and 873.76 eV are assigned to $Ni^{2+}$, while those at 857.91 and 875.78 eV correspond to $Ni^{3+}$, and two shakeup satellites. As depicted in FIG. 2E, S 2p peak spectrum demonstrated the presence of S $2p_{3/2}$ and S $2p_{1/2}$ spin-orbit doublet accompanied with one broad satellite and another peak at 158.53 eV could be ascribed to Ni- or Co-deficient nonstoichiometric sulfides. The Cu 2p spectrum in FIG. 2F exhibits the one satellite peak and the strong fitting peaks at 931.99 and 952.2 eV are indexed to $Cu^{1+}$, whereas the peaks at 934.23 and 954.24 eV can be indicated as $Cu^{2+}$. As depicted in FIG. 2G, the Mn 2p spectrum of hybrid displays fitting peaks at 641.82 and 653.81 eV corresponding to $Mn^{2+}$, and the other peaks observed at 643.16 and 654.75 eV are ascribed to $Mn^{3+}$. The high-resolution O 1s spectrum (FIG. 2H) shows three characteristic peaks at 532.46 eV (O1), 531.38 eV (O2) and 530.38 eV (O3), which can be indexed to physically adsorbed molecular water, hydroxyl group and lattice O, respectively. These measurements confirm the successful growth of hybrid Co—Ni—S NPs/Cu—Ni—Mn—O NSAs.

Figure 3A:
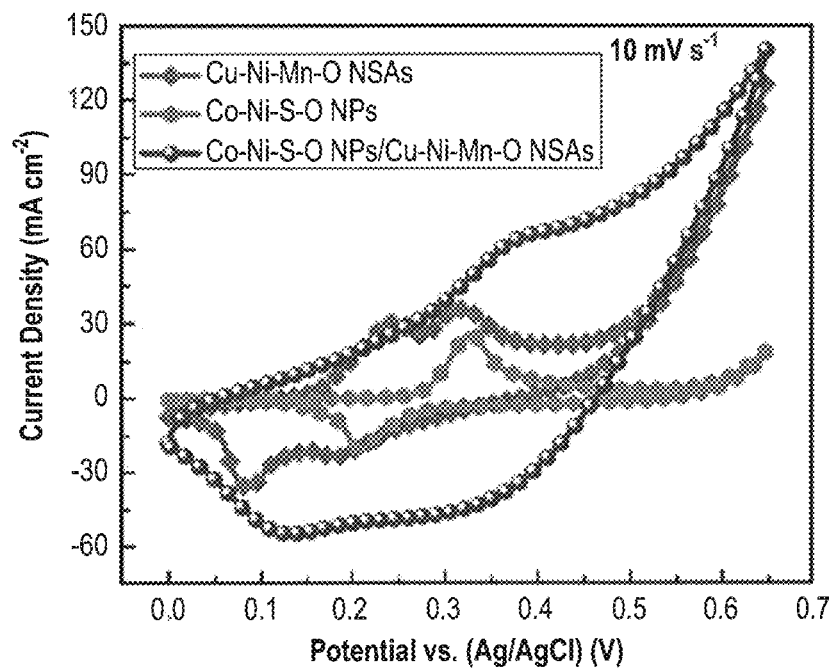
FIGS. 3A-3H are graphs relating to electrochemical properties of exemplary Co—Ni—S NPs, Cu—Ni—Mn—O NSAs and Co—Ni—S NPs/Cu—Ni—Mn—O NSAs, depicting 3(A) comparative capacitance-voltage (CV) curves; 3(B) comparative galvonostatic charge discharge (GCD) curves of as-prepared electrodes; 3(C) CV curves of an exemplary Co—Ni—S NPs/Cu—Ni—Mn—O NSAs electrode at different scan rates; 3(D) the b-value obtained from the plot of log(i) vs. log(v) for the cathodic peaks of the as-fabricated electrodes; 3(E) GCD curves of Co—Ni—S NPs/Cu—Ni—Mn—O NSAs electrode at different current densities; 3(F) specific capacity values of as-prepared electrodes as a function of current density; 3(G) the Nyquist plot, where the inset shows the high magnified Electrochemical Impedance Spectroscopy (EIS) plot and equivalent circuit diagram; and 3(H) the cycling life of the as-developed electrodes.
Figure 3B:
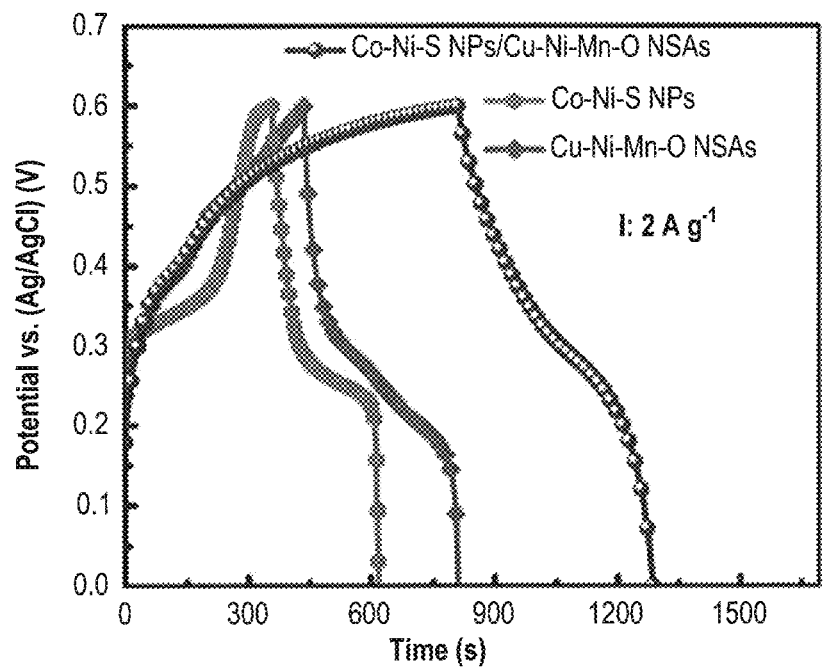

As depicted in FIG. 2, the Co—Ni—S NPs, Cu—Ni—Mn—O NSAs and Co—Ni—S NPs/Cu—Ni—Mn—O NSAs samples exhibit the typical IV isotherms with H3-type hysteresis loops (P/P, >4), revealing the presence of mesoporores. Interestingly, the hybrid Co—Ni—S NPs/Cu—Ni—Mn—O NSAs delivers an enhanced specific surface area of 147.89 $m^2 g^{-1}$ compared to Co—Ni—S NPs (42.47 $m^2 g^{-1}$) and Cu—Ni—Mn—O NSAs (76.18 $m^2 g^{-1}$), respectively. Further, the as-prepared materials exhibit pore size distribution in the range of 1.5 to 5.7 nm, revealing excellent mesoporous architecture of the electrode materials. The mesoporous structure and high specific surface area with multivalent Co, Ni, Cu, Mn, and S species in the material lead to enhanced redox rate of the material, which ultimately improves energy storage performance The electrochemical behaviors of the as-fabricated Co—Ni—S NPs/Cu—Ni—Mn—O NSAs cathode material were explored in a three electrode setup using CV, GCD and EIS studies. FIG. 3A depicts the comparative CV profiles of the Co—Ni—S NPs, Cu—Ni—Mn—O NSAs and Co—Ni—S NPs/Cu—Ni—Mn—O NSAs samples at a scan rate of 10 mV $s^{-1}$ in the 0-0.65 V potential range. From the CV plots, all sample electrodes exhibit a pair of Faradaic redox peaks, revealing the battery-type phenomena of the material. Among the three electrodes, the Co—Ni—S NPs/Cu—Ni—Mn—O NSAs sample delivers larger CV integral area and higher redox peak currents than the other samples, indicating that the hybrid cathode material possesses an enhanced specific capacity. The higher redox behavior of the Co—Ni—S NPs/Cu—Ni—Mn—O NSAs presumably arises from the increased surface area, rich electroactive sites and enhanced electrode/electrolyte contact areas. FIG. 3B depicts the comparative GCD curves of the exemplary Co—Ni—S NPs, Cu—Ni—Mn—O NSAs and Co—Ni—S NPs/Cu—Ni—Mn—O NSAs electrodes at 2 A $g^{-1}$. All of the GCD profiles exhibit a typical battery-type property, which is consistent with the CV results. As expected, the discharge time of the Co—Ni—S NPs/Cu—Ni—Mn—O NSAs electrode is much greater than the Co—Ni—S NPs and Cu—Ni—Mn—O NSAs electrodes. As a result, the specific capacity of Co—Ni—S NPs/Cu—Ni—Mn—O NSAs electrode is estimated to be 263 mA h $g^{-1}$, which is superior to Co—Ni—S NPs (144.47 mA h $g^{-1}$) and Cu—Ni—Mn—O NSAs (208.26 mA h $g^{-1}$) samples.

Figure 3C:
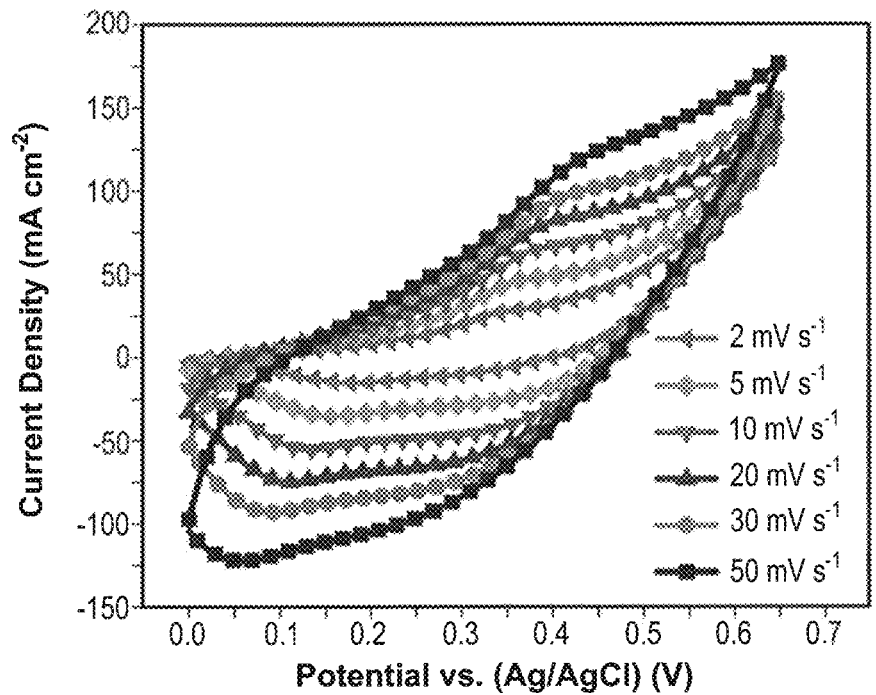
Figure 3D:
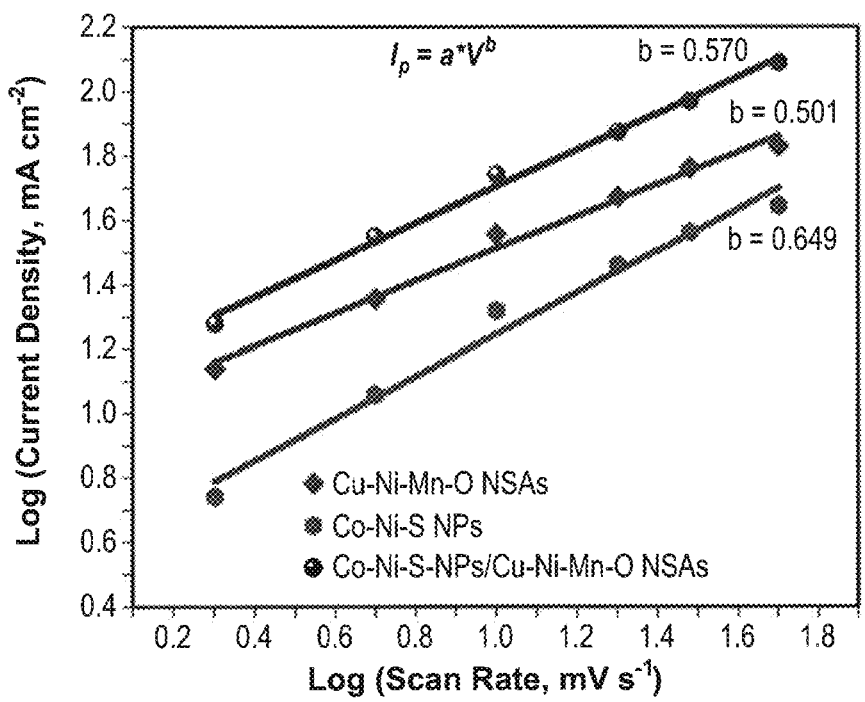

The electrochemical behaviors of the Co—Ni—S NPs/Cu—Ni—Mn—O NSAs electrode were examined with CV and GCD studies to determine the electrochemical activity, rate capability and cycling performance. FIG. 3C shows the CV plots of the Co—Ni—S NPs/Cu—Ni—Mn—O NSAs electrode at scan rates from 2-50 mV $s^{-1}$. A pair of Faradaic redox peaks are observed in each curve in the potential range of 0-0.65 V, which is presumably due to the reversible redox reactions of $Co^{2+}/Co^{3+}$, $Ni^{2+}/Ni^{3+}$, $Mn^{2+}/Mn^{3+}$, and $Cu^{1+}/Cu^{2+}$. With increasing sweep rate, the anodic and cathodic peaks were shifted to higher and lower potentials, respectively, and the current response was enhanced. Similar CV shapes were observed with increasing scan rates, demonstrating good rate capability. In order to demonstrate the electrochemical kinetics of the as-fabricated samples, the dependence of cathode peak response ($i_p$) on the scan rate (v) was determined according to the relation $i_p=a.v^b$, where a and b are variable constants, and b is in the range of 0.5<b<1 where the b value can be estimated from the slope of log(v)-log($i_p$) plot. Typically, b of 0.5 indicates a diffusion-controlled current response (or battery-type behavior), whereas b of 1.0 represents a surface-controlled process (or capacitive process). As depicted in FIG. 3D, the calculated b-values for Co—Ni—S NPs, Cu—Ni—Mn—O NSAs and Co—Ni—S NPs/Cu—Ni—Mn—O NSAs electrodes are in the range of 0.501-0.649, which are very close to 0.5, proving the typical diffusion-controlled process or battery-type behavior.

Figure 3E:
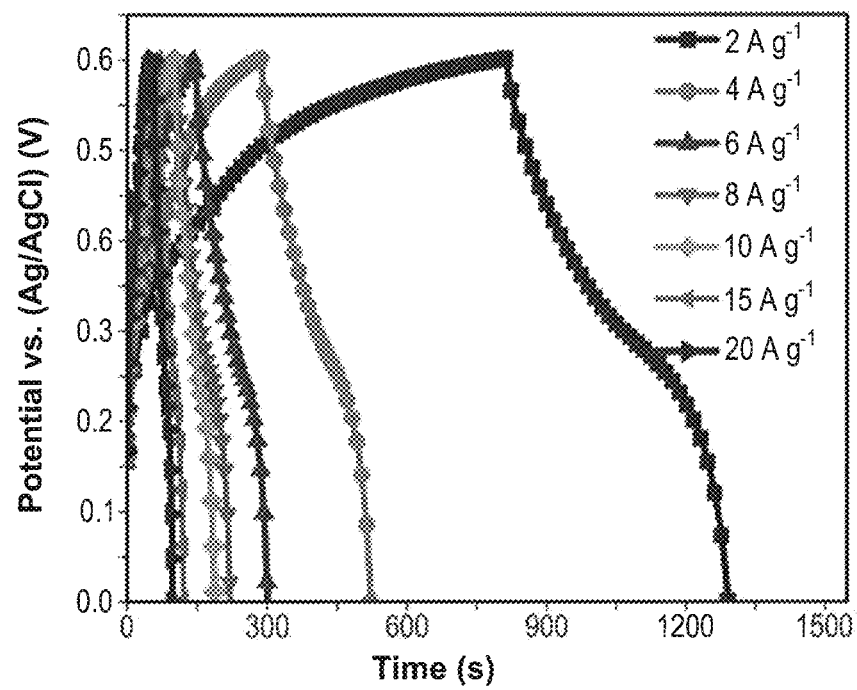
Figure 3F:
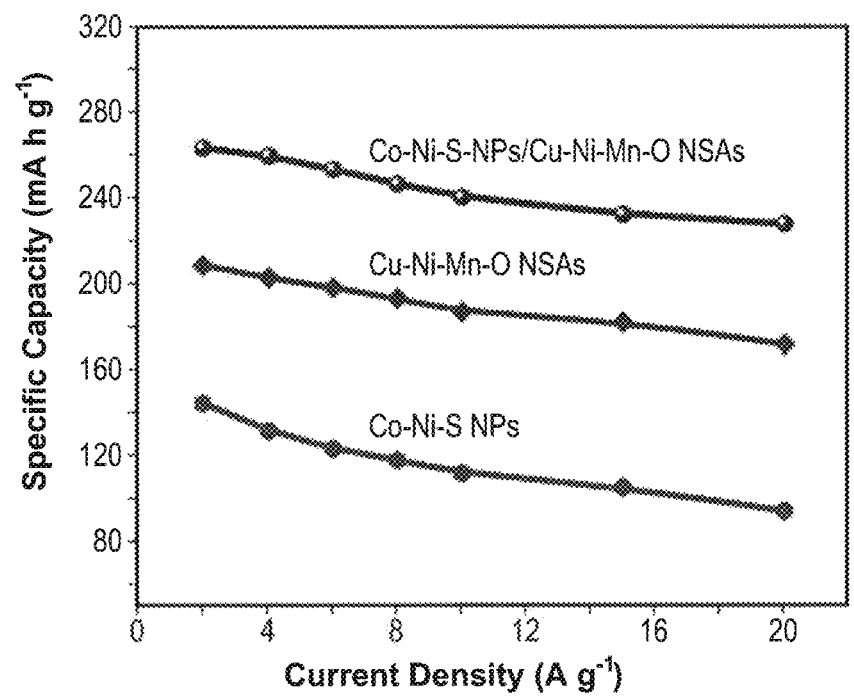
Figure 3G:
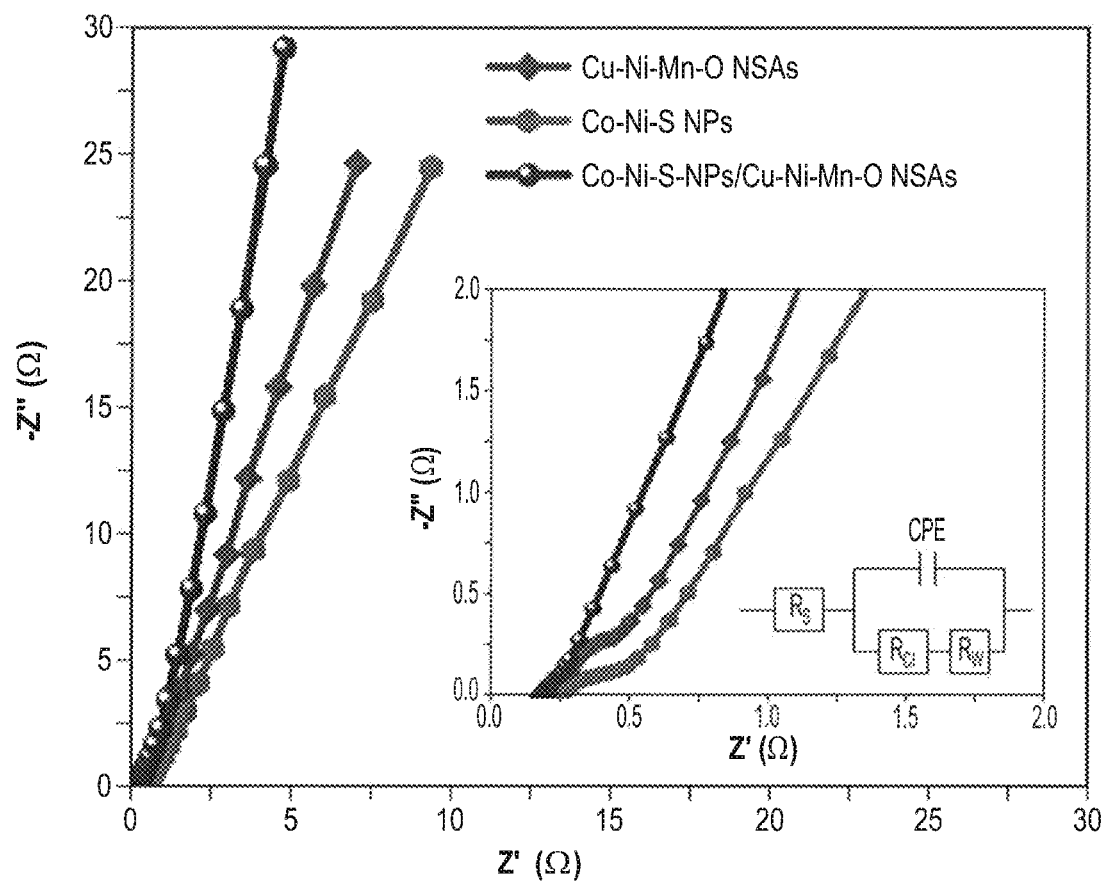
Figure 3H:
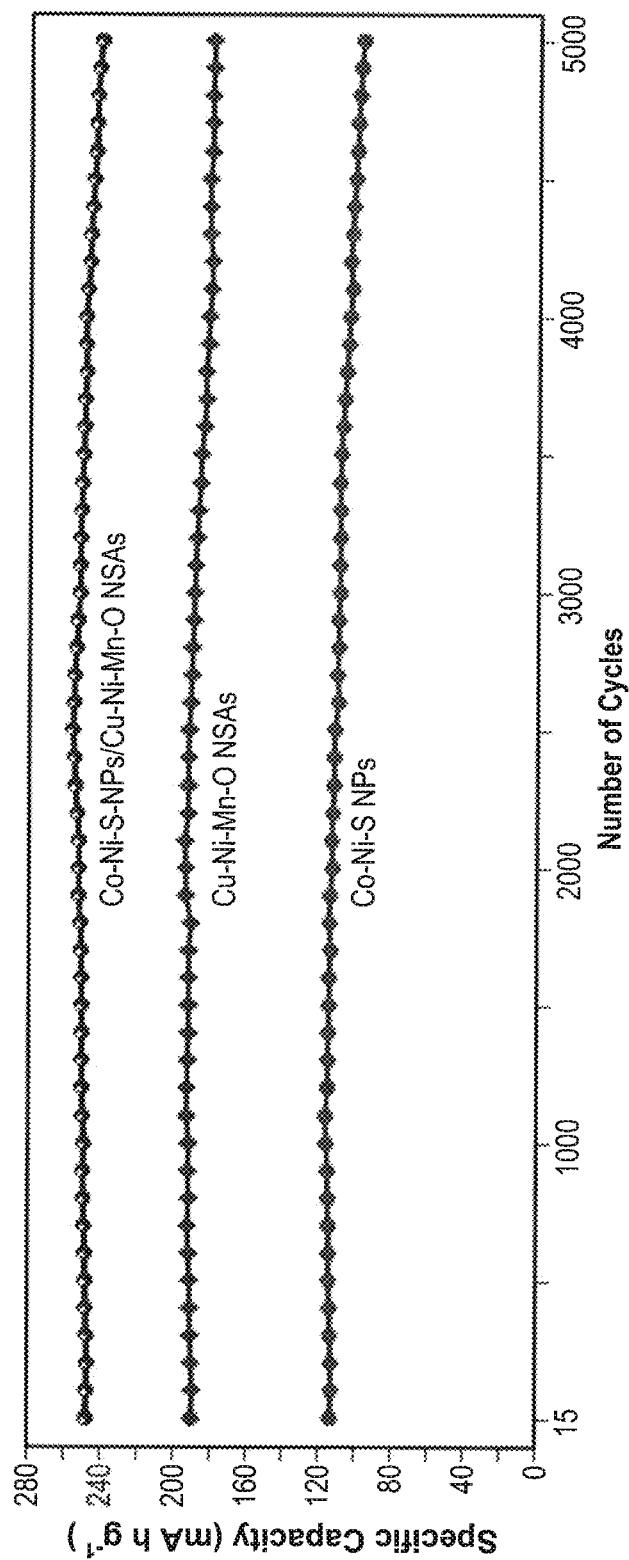

The GCD plots of the Co—Ni—S NPs, Cu—Ni—Mn—O NSAs and Co—Ni—S NPs/Cu—Ni—Mn—O NSAs electrodes were investigated in the 0-0.6 V at different current densities of 2-20 A $g^{-1}$ and the relevant GCD plots are depicted in FIG. 3E. The discharge time is lower compared to the charging time for the GCD plot obtained at low current density (2 A $g^1$), which is presumably due to the slow diffusion of electrolyte ions into the composite material, causing a long time for activating all the components of the composite material (i.e., Co—Ni—S NPs coated Cu—Ni—Mn—O NSAs). Therefore, it takes a long charging time to perform redox reactions with the composite material at the interface of the electrode-electrolyte. Apart from the GCD plot obtained at 2 A $g^{-1}$, all other GCD plots delivered nearly symmetric charge-discharge times at higher current densities, indicating good reversibility of the exemplary cathode material. Also, the GCD plots of all the samples show non-linear charge-discharge with non-capacitive Faradaic redox behavior of battery-type materials. FIG. 3F shows the specific capacity values of as-developed electrodes with respect to current densities. The specific capacity of Co—Ni—S NPs/Cu—Ni—Mn—O NSAs cathode material reduces from 263 to 227.6 mA h $g^{-1}$ with current density increasing from 2 to 20 A $g^{-1}$, revealing an excellent rate capability of 86.54%. The Co—Ni—S NPs and Cu—Ni—Mn—O NSAs electrodes deliver rate capabilities of 65.14% and 82.30% in the same conditions, respectively, which are lower than the exemplary Co—Ni—S NPs/Cu—Ni—Mn—O NSAs cathode material. The outstanding results of the hybrid cathode material is due to the introduction of Co—Ni—S NPs over the Cu—Ni—Mn—O NSAs surface, which apparently enhances conductivity of the electrode material, increases the surface area and provides rich electroactive sites. The Nyquist plots of the as-prepared samples are shown in FIG. 3G. The obtained Nyquist plots are analyzed by fitting to an equivalent electrical circuit, which contains equivalent series resistance ($R_S$), charge-transfer resistance (Ru), constant-phase element (CPE), and Warburg impedance (W). The intercept of the plots with the X-axis in the high-frequency region corresponds to the $R_S$, which includes the intrinsic resistance of active materials, ionic resistance of electrolyte, and contact resistance at the active material/current collector interface. As depicted in the Nyquist plots (FIG. 3G), in the low-frequency region, the slope of the straight line for Co—Ni—S NPs/Cu—Ni—Mn—O NSAs hybrid electrode is closer to the y-axis than that of Co—Ni—S NPs and Cu—Ni—Mn—O NSAs electrodes, which demonstrates the lower Warburg impedance suggesting better ionic transport. The Co—Ni—S NPs/Cu—Ni—Mn—O NSAs electrode displays smaller $R_S$ (0.179Ω) and R, (0.104Ω) than those of the Co—Ni—S NPs ($R_S$=0.262Ω; $R_S$=0.272Ω) and Cu—Ni—Mn—O NSAs ($R_S$=0.261Ω; $R_{ct}$=0.176Ω) electrodes, indicating improved electrical conductivity and fast charge transition. The cycling behavior of the as-fabricated electrodes was examined at 8 A $g^{1-}$ over 5000 cycles (FIG. 3H). The Co—Ni—S NPs/Cu—Ni—Mn—O NSAs electrode exhibits superior cycling performance with capacity retention of 94.67%, which is much higher than the Co—Ni—S NPs (85.69%) and Cu—Ni—Mn—O NSAs (94.67%) electrodes over the same number of cycles.

Example 3

Synthesis of Exemplary Anode Material

Synthesis of MnFe2O4-ZnFe2O4/G-Ink Anode Material:

In a first step, G-ink\ on Ni foam was fabricated using a brush-coating method. Briefly, a commercially available G-ink slurry was spread on a Ni foam (2×2 cm$^2$) with a brush and dried at 100° C. for 12 h. In a second step, the $MnFe_2O_4$—$ZnFe_2O_4$ material was loaded on the G-ink coated Ni foam by a hydrothermal route. 0.05 M $Mn(NO_3)_2.6H_2O$, 0.05 M $Zn(NO_3)_2.6H_2O$, 0.1 M $Fe(NO_3)_2.6H_2O$, 0.12 M $NH_4F$ and 0.24 M $CH_4N_2O$ were mixed in 70 mL DI water and added with the G-ink coated Ni foam to a 100 mL Teflon autoclave reactor. The autoclave was heated at 100° C. for 10 h. Subsequently, the samples were washed with DI water, dried in an oven at 60° C. for 12 h, and then annealed at 200° C. for 2 h to provide $MnFe_2O_4$—$ZnFe_2O_4$/G-ink on Ni (hereinafter, Mn—Zn—Fe—O/G-ink). The loading masses of G-ink and Mn—Zn—Fe—O/G-ink material on Ni foam were estimated to be 3.4 and 4.3 mg cm respectively.

Example 4

Electrochemical Properties of Exemplary Anode Materials

The morphology, crystalline structure, phase purity, elemental valence states, chemical composition and surface area of the as-developed anode materials were investigated using scanning electron microscopy (SEM, 5-4800), transmission electron microscopy (TEM), high-resolution TEM (HR-TEM), X-ray diffraction (XRD, D8 ADVANCE), X-ray photoelectron spectrometer (XPS, ESCALAB 250) and $N_2$ adsorption-desorption technique (ASAP 2020). The SEM, XRD, XPS, TEM and $N_2$ adsorption-desorption measurements were conducted using the above exemplary material-loaded Ni foam, as were additional electrochemical measurements.

Figure 4A:
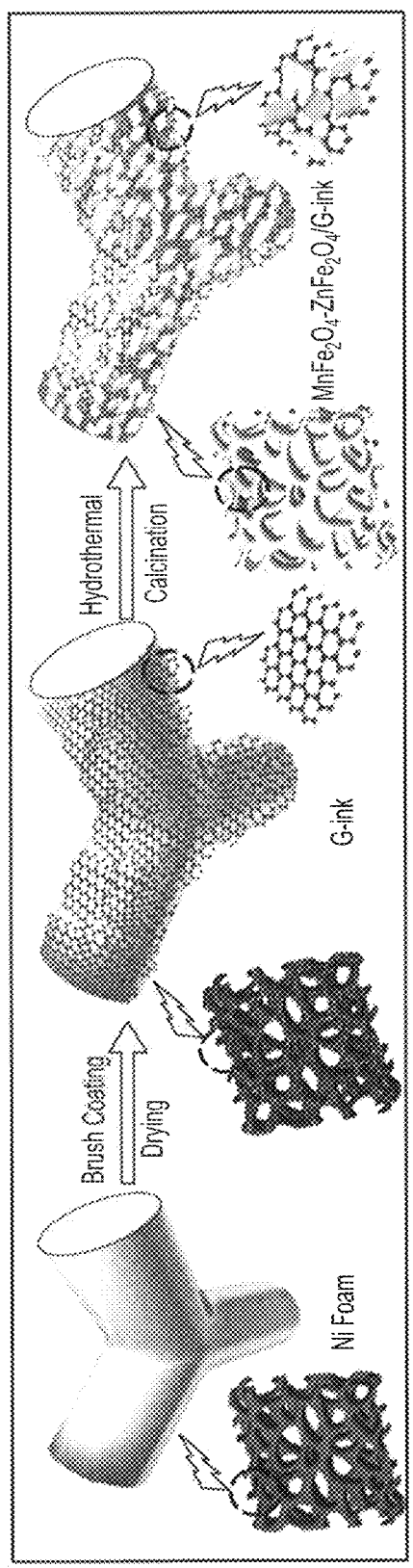

Presumed Fabrication and Electrochemical Properties of the Anode Material:

The formation process of Mn—Zn—Fe—O/G-ink composite is shown in FIG. 4A. In the first step, the G-ink nanosheets are deposited on Ni foam by a brush-coating process followed by drying. Afterwards, the rhombus-like shaped Mn—Zn—Fe—O nanocrystals were grown on the G-ink/nickel foam via a hydrothermal reaction followed by a simple calcination process. The morphology and structure of the as-prepared samples were investigated using SEM and TEM analyses, the rhombus-like Mn—Zn—Fe—O nanocrystals were well-grown on the surface of G-ink nanosheets, as depicted in FIGS. 4(B-D). The G-ink nanosheets are not evident in SEM images, which is due to the surface of G-ink being fully covered with rhombus-like Mn—Zn—Fe—O nanocrystals. Therefore, TEM measurements were conducted to identify the morphology of the of Mn—Zn—Fe—O/G-ink composite, and the results are shown in FIGS. 4(E-F). The Mn—Zn—Fe—O/G-ink composite has Mn—Zn—Fe—O nanostructures thoroughly deposited on the surface of the G-ink nanosheets. Moreover, the IR-TEM image depicted in FIG. 4G shows the lattice spacing of 0.256 and 0.253 nm, which corresponds to the (311) plane of $MnFe_2O_4$ and (311) plane of $ZnFe_2O_4$, respectively.

Additionally, STEM-EDS was conducted to better understand the growth of rhombus-like Mn—Zn—Fe—O nanocrystals on G-ink nanosheets surface in the anode material.

Figure 5A:
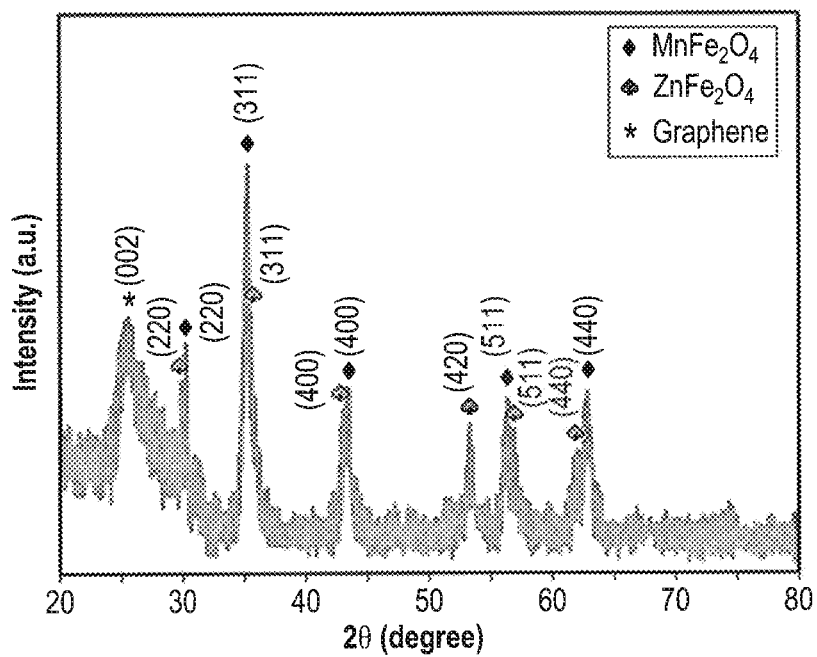
FIGS. 5A-5I depict 5(A) XRI) pattern, 5(B) XPS spectrum, and 5(C)-5(G) high-resolution XPS analysis of the rhombus-like Mn—Zn—Fe—O/G-ink nanosheets on Ni foam surface. 5(H) $N_2$ adsorption-desorption isotherms and 5(I) pore-size distribution of as-fabricated electrodes.
Figure 5B:
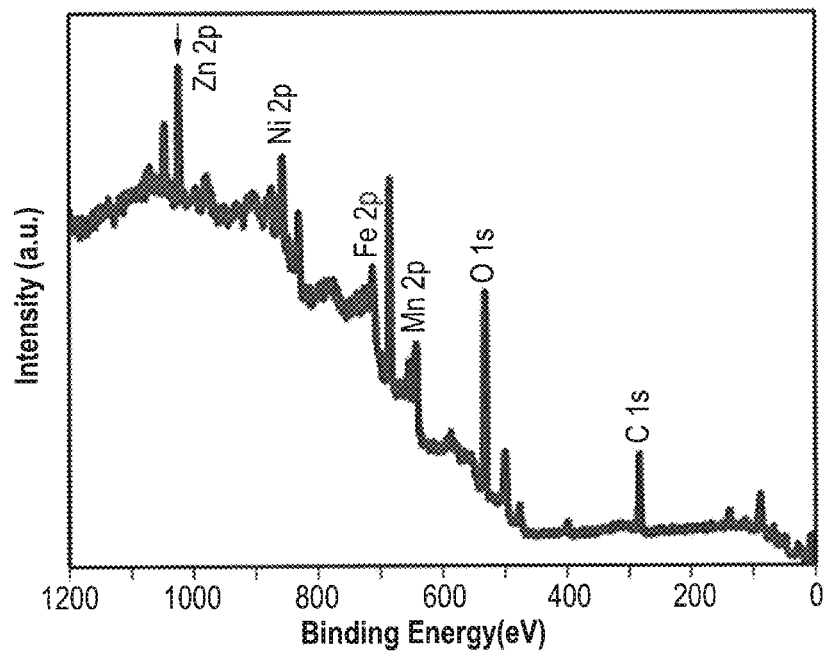
Figure 5C:
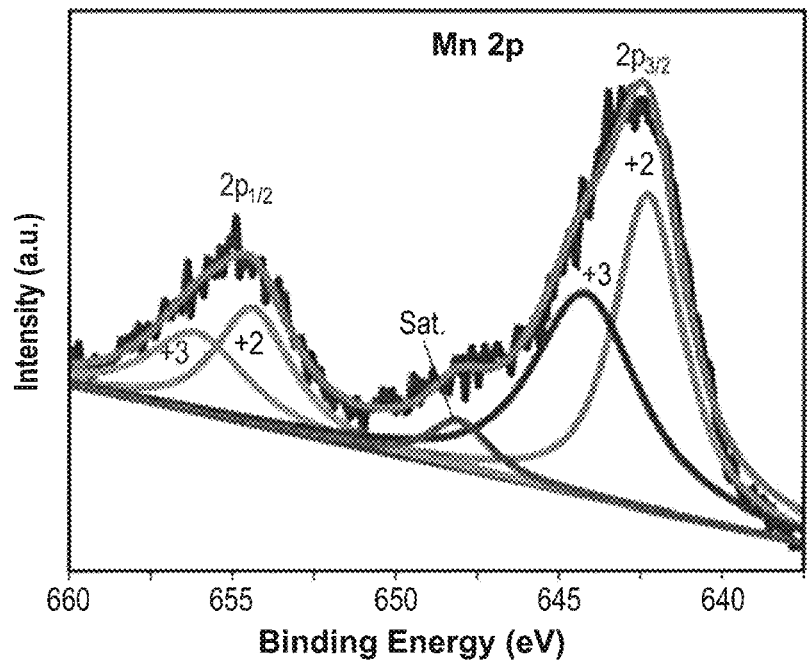
Figure 5D:
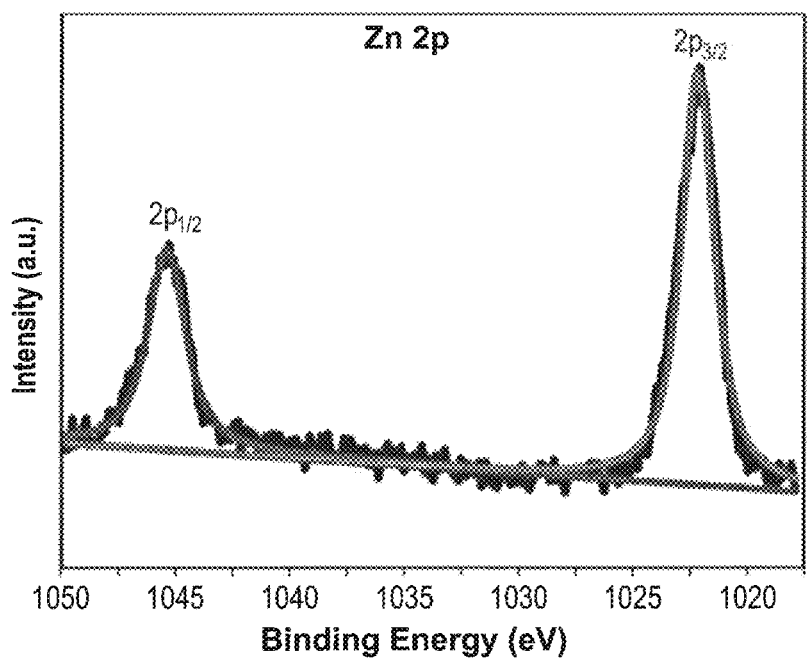
Figure 5E:
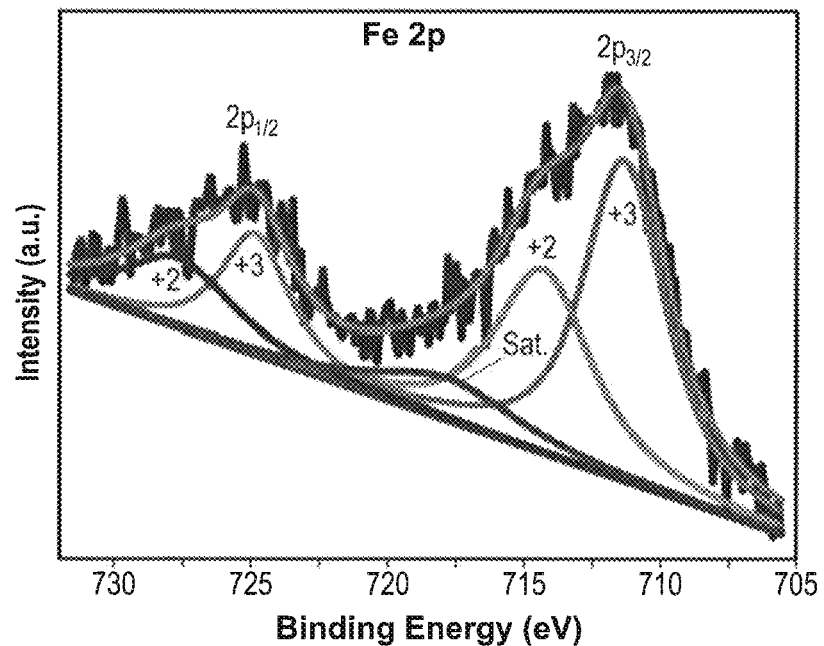
Figure 5F:
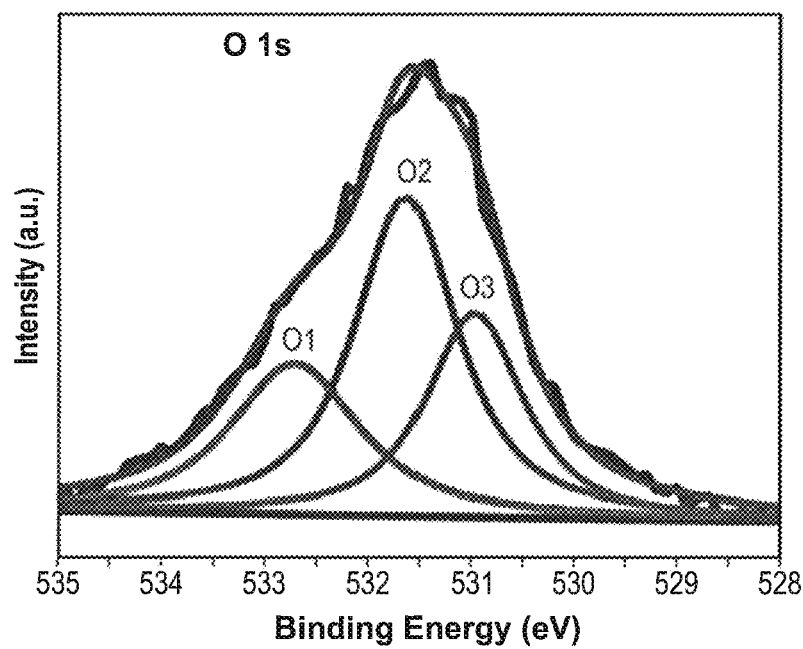
Figure 5G:
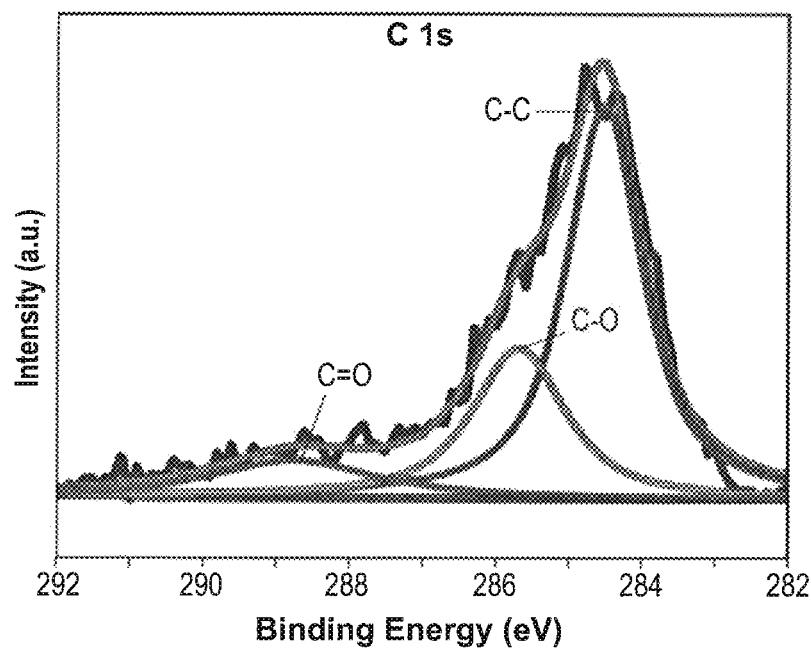
Figure 5H:
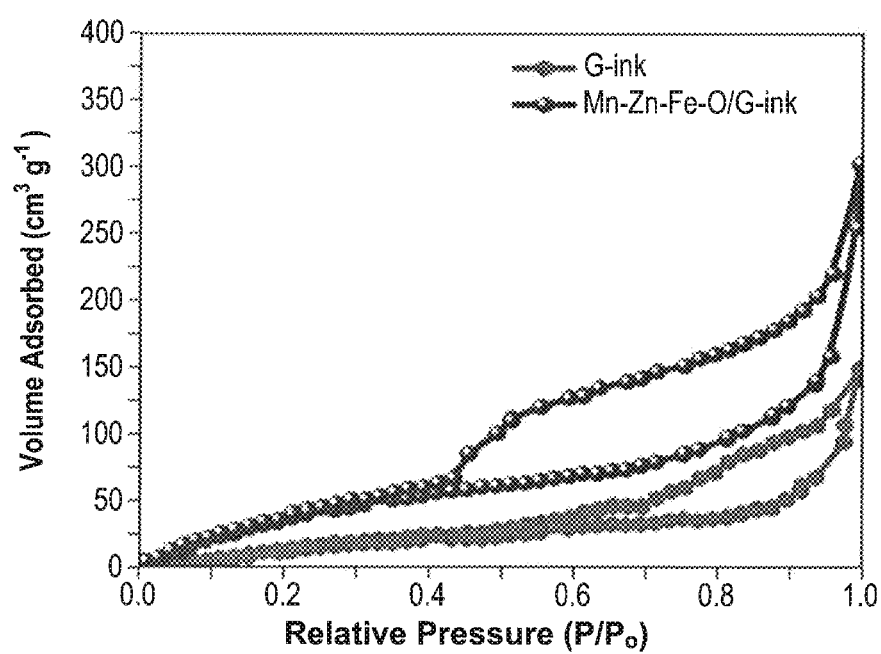
Figure 5I:
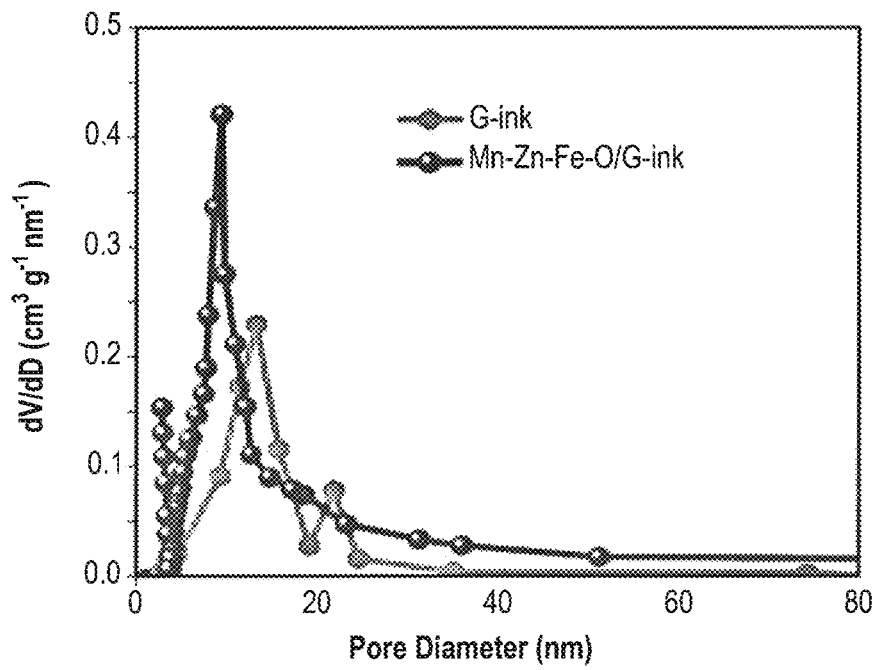

The XRD pattern of the exemplary anode is shown in FIG. 5A, in which the broad peak at 25.4° can be ascribed to the (002) crystallographic plane of graphene. Additionally, the diffraction peaks at 30.2°, 35.6°, 43.5°, 56.2° and 62.7° can be well ascribed to (220), (311), (400), (511) and (440) planes of $MnFe_2O_4$ (JCPDS no. 10-0319), and $ZnFe_2O_4$ exhibits peaks at 29.9°, 353°, 42.9°, 53.1°, 56.8° and 62.1° corresponding to (220), (311), (400), (420), (511) and (440) planes (JCPDS no. 79-1150), respectively. The XPS survey spectrum shown in FIG. 5B evinces Zn, Ni, Mn, Fe, C and O signals in the anode material, without any other apparent impurity. FIGS. 5C-5G show high resolution views of the spectrum peaks of FIG. 5B. The presence of Ni signal in the survey spectrum is due to the background of Ni foam. The high-resolution spectrum of Mn 2p confirms the presence of $Mn^{2+}$ (642.31 and 654.45 eV) and $Mn^{3+}$ (644.29 and 656.29 eV) along with one shake-up satellite peak. The Zn 2p spectrum shows the binding energies at 1022.27 and 1045.38 eV relates to Zn $2p_{3/2}$ and Zn $2p_{1/2}$ of Zn(II). The Fe $2p_{3/2}$ (711.42 eV for $Fe^{3+}$ and 714.39 eV for $Fe^{2+}$) and Fe $2p_{1/2}$ (721.02 eV for $Fe^{3+}$ and 721.99 eV for $Fe^{2+}$) peaks indicate the presence of $Fe^{2+}$ and $Fe^{3+}$ states. The deconvoluted three peaks at 530.9 eV ($O_3$), 531.5 eV ($O_2$) and 532.7 eV (O1) from the O 1s spectrum corresponds to metal-oxygen bond, hydroxyl groups ($OH^-$) and physi-/chemisorbed water on the film surface, respectively. FIG. 5G shows the C 1s peaks at 284.5, 285.69 and 288.79 eV can be assigned to the C—C, C—O, and C=C bonds, respectively. Further, the specific surface area of rhombus-like Mn—Zn—Fe—O/G-ink nanosheets (263 m$^2$ g$^{-1}$) is superior to that of bare G-ink nanosheets (98 m$^2$ g$^{-1}$) (FIG. 5H). The large specific surface areas provide more utilization of active materials and shortens the ion diffusion paths, which result in enhanced pseudocapacitive performance. The as-prepared electrodes exhibit similar pore-sized distributions of mesopores to micropores (FIG. 5I)

Figure 6A:
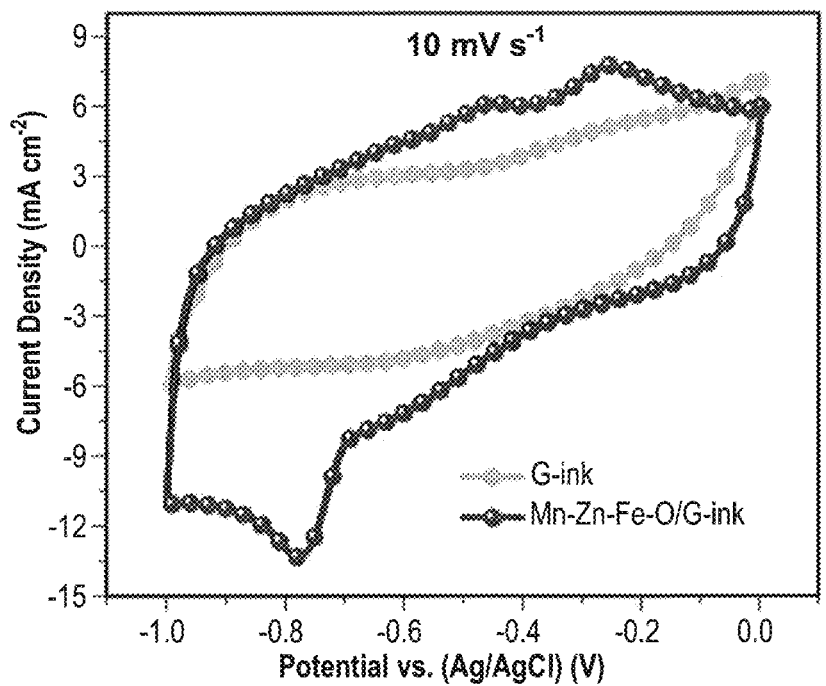
FIGS. 6(A)-6(G) relate to electrochemical properties of G-ink and Mn—Zn—Fe—O/G-ink electrodes, depicting 6(A)-6(B) comparative CV and GCD profiles, respectively, of as-fabricated samples; 6(C)-6(D) CV and GCD profiles of Mn—Zn—Fe—O/G-ink electrode at various scan rates and current densities; 6(E)-6(G) specific capacity values, a Nyquist plot (inset shows the high magnified EIS plot and equivalent circuit diagram) and cycling performance, respectively, of the as-prepared electrodes.
Figure 6B:
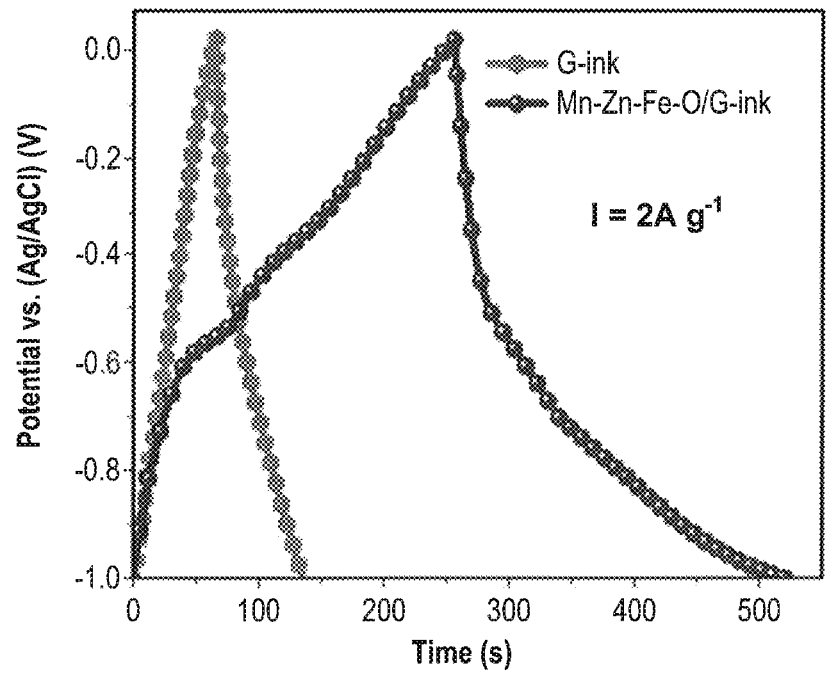
Figure 6C:
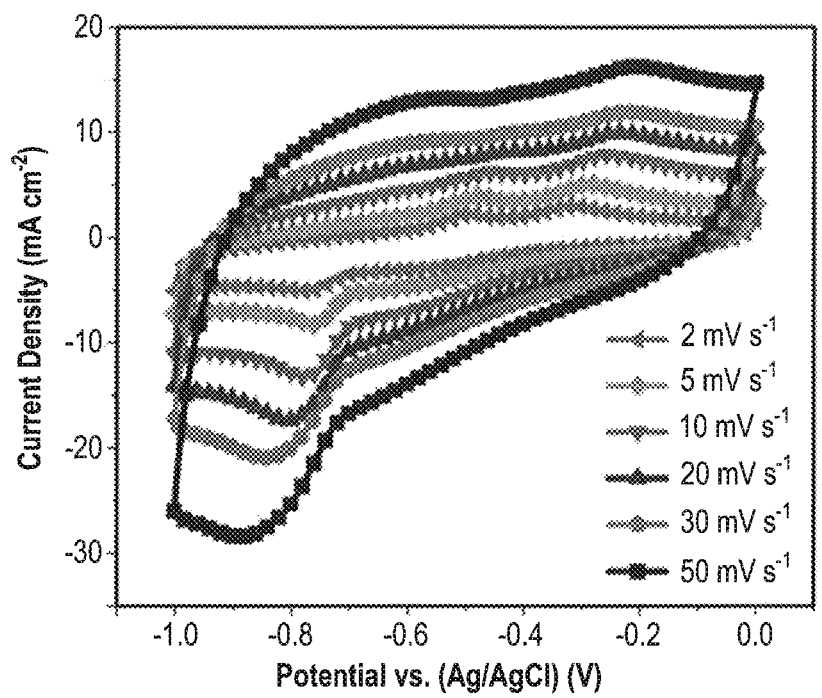
Figure 6D:
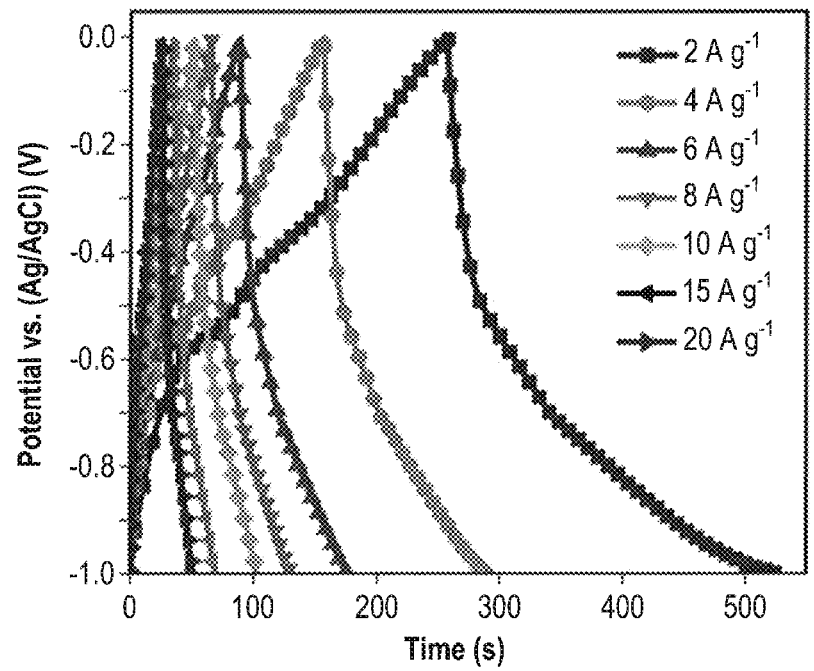
Figure 6E:
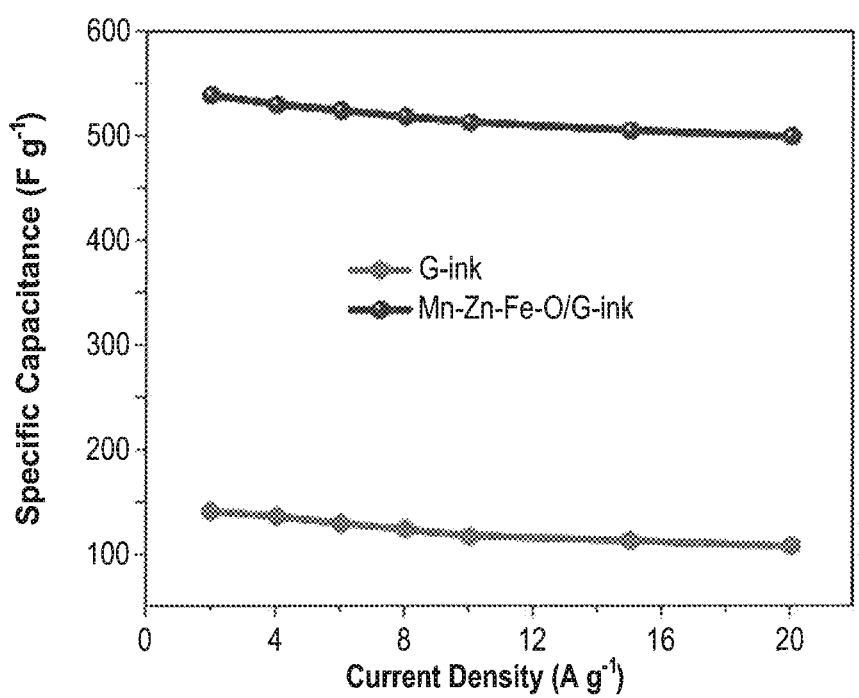
Figure 6F:
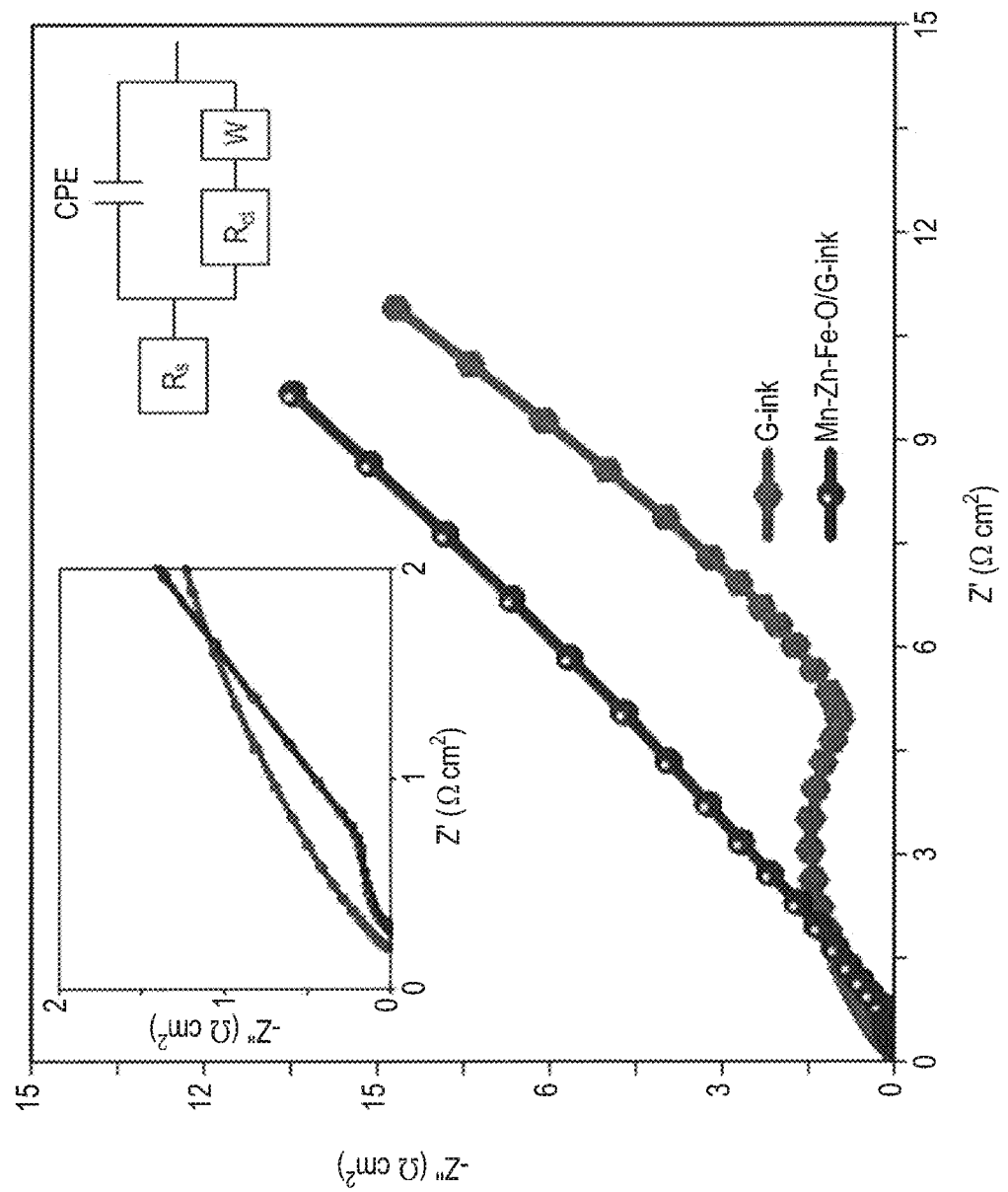
Figure 6G:
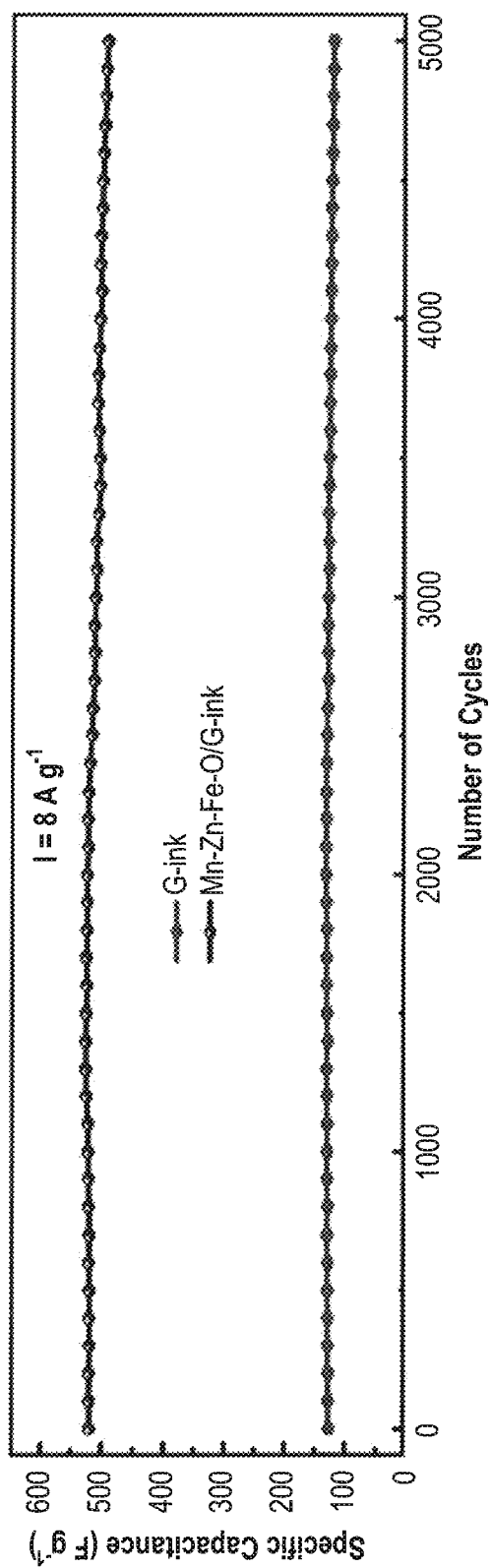

FIG. 6A depicts CV plots of G-ink and Mn—Zn—Fe—O/G-ink samples at a constant scan rate of 10 mV s$^{-1}$. The CV plot of G-ink exhibits a typical quasi-rectangular shape without any peaks, indicating the electrochemical double layer charging behavior. In contrast, the Mn—Zn—Fe—O/G-ink anode material shows one pair of redox peaks due to Faradaic redox reactions associated with M-O/M-O—OH (where M refers to Mn or Zn or Fe), illustrating the pseudocapacitive nature of the present anode material. Interestingly, the integral area and current response of Mn—Zn—Fe—O/G-ink is larger than that of the G-ink alone, demonstrating that the composite material possesses an enhanced specific capacitance, presumably originating from the increased surface area and an apparent cooperative effect from the Mn—Zn—Fe—O and G-ink materials. FIG. 6B shows the GCD profiles of the exemplary G-ink and Mn—Zn—Fe—O/G-ink at 2 A g$^{-1}$. The composite Mn—Zn—Fe—O/G-ink electrode delivers a much longer discharge time than the G-ink electrode, which is consistent with the CV studies. The CV profiles of G-ink and Mn—Zn—Fe—O/G-ink electrodes examined at scan rates ranging from 2-50 mV s$^{-1}$ are depicted in FIGS. 6C-6D. A pair of redox peaks and the similar CV plot shapes are detected even at high scan rates, suggesting ideal pseudocapacitive behavior and high rate capabilities of the electrode. FIG. 6E shows the GCD plots of G-ink and Mn—Zn—Fe—O/G-ink electrodes at various current densities. It can be observed that the Mn—Zn—Fe—O/G-ink electrode exhibits nonlinear GCD curves, which can be ascribed to pseudocapacitive behavior, consistent with the CV results. FIG. 6E depicts the specific capacitance values of the as-fabricated samples estimated from the GCD plots. The Mn—Zn—Fe—O/G-ink hybrid electrode achieves superior specific capacitance of 537.96 F g$^{-1}$ (149.44 mA h g$^{-1}$) at 2 A g$^{-1}$, which is 3.81 times higher than that of the bare G-ink electrode (141.14 F g$^{-1}$) at a same current density. Even at high current density of 20 A g$^{-1}$, the composite electrode can still deliver a high capacitance retention of 92.64% (498.4 F g$^{-1}$/138.44 mA h g$^{-1}$), which is greater than that of bare G-ink electrode with 76.51% (108 F g$^{-1}$) capacitance retention. As depicted in FIG. 6F, the Nyquist plot of Mn—Zn—Fe—O/G-ink hybrid electrode shows much lower charge transfer resistance ($R_{ct}$=0.51 Ω cm$^2$) and a more vertical line (lower Warburg impedance) than the bare G-ink ($R_{ct}$=4.78 Ω cm$^2$) electrode, representing faster charge transfer kinetics and good ion diffusion. Furthermore, the cycling stability of G-ink and Mn—Zn—Fe—O/G-ink electrodes were evaluated at 8 A g$^{-1}$. The stability results reveal that the Mn—Zn—Fe—O/G-ink electrode exhibits higher capacitance retention of 94.83% over 5000 cycles compared with bare-G-ink electrode (94.67%), as depicted in FIG. 6G. Accordingly, the results demonstrated higher specific capacitance, rate capability and cycling life properties of Mn—Zn—Fe—O/G-ink electrode.

Example 5

ASC Comprising the Exemplary Cathode and Anode Materials

Figure 7A:
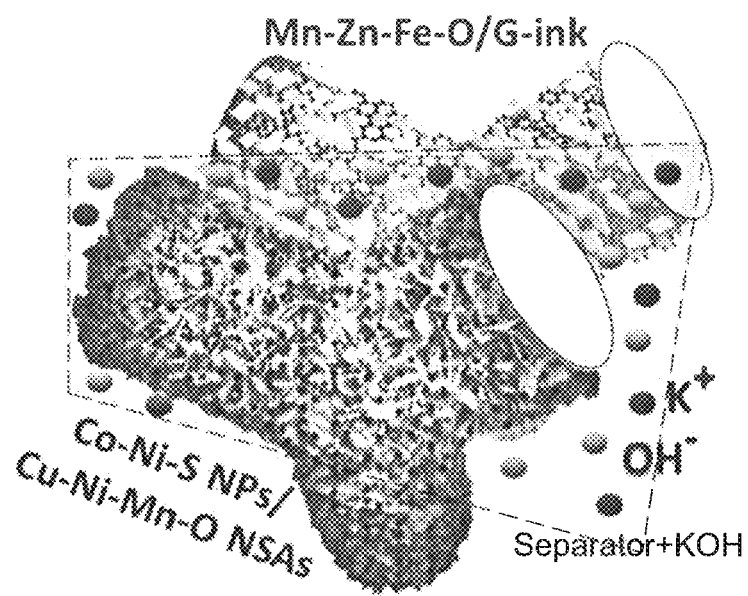
FIGS. 7(A)-7(H) are graphs relating to electrochemical properties of an exemplary fabricated Co—Ni—S NPs/Cu—Ni—Mn—O NSAs//Mn—Zn—Fe—O/G-ink ASC device depicting 7(A) a schematic illustration of the exemplary ASC fabrication; 7(B)-7(C) CV and GCD curves, respectively, of the ASC obtained in the various potential windows; 7(D)-7(G) CV curves; 7(E) GCD curves; 7(F) specific capacity values; 7(G) the Ragone plot of the exemplary ASC; and 7(H) the cycling life of the exemplary ASC over 5000 cycles (inset shows two serially connected ASCs powering LED, GCD profiles of initial and final cycles of the exemplary ASC, and Nyquist plots of the exemplary ASC before and after cycling).

An exemplary ASC using Co—Ni—S NPs/Cu—Ni—Mn—O NSAs as a positive electrode, Mn—Zn—Fe—O/G-ink as a negative electrode and a cellulose paper as separator with KOH aqueous electrolyte was fabricated as shown in FIG. 7A.

The achieved energy density of the as-prepared Co—Ni—S NPs/Cu—Ni—Mn—O NSAs//Mn—Zn—Fe—O/G-ink ASC device is 75.65 W h kg$^{-1}$ at 622 W kg$^{-1}$, superior to the other hierarchical electrode material based ASC devices, which often achieve 20-60 Whkg$^{-1}$ at 200-600 Wkg$^{-1}$. The present ASC also achieved superior cycling stability of 96.89% retention with 98.26% of columbic efficiency over 5000 cycles and a large operating potential window of 1.6 V.

Figure 7B:
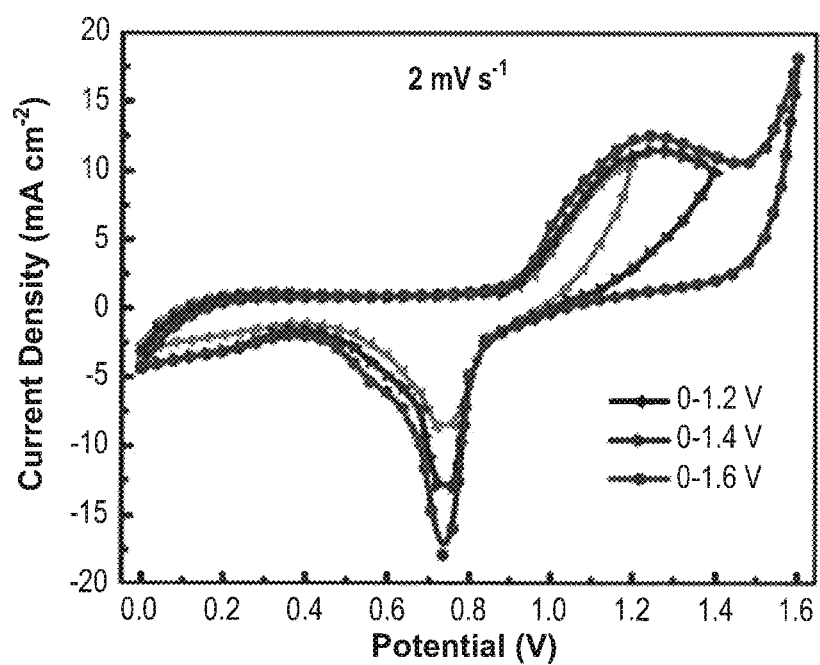
Figure 7C:
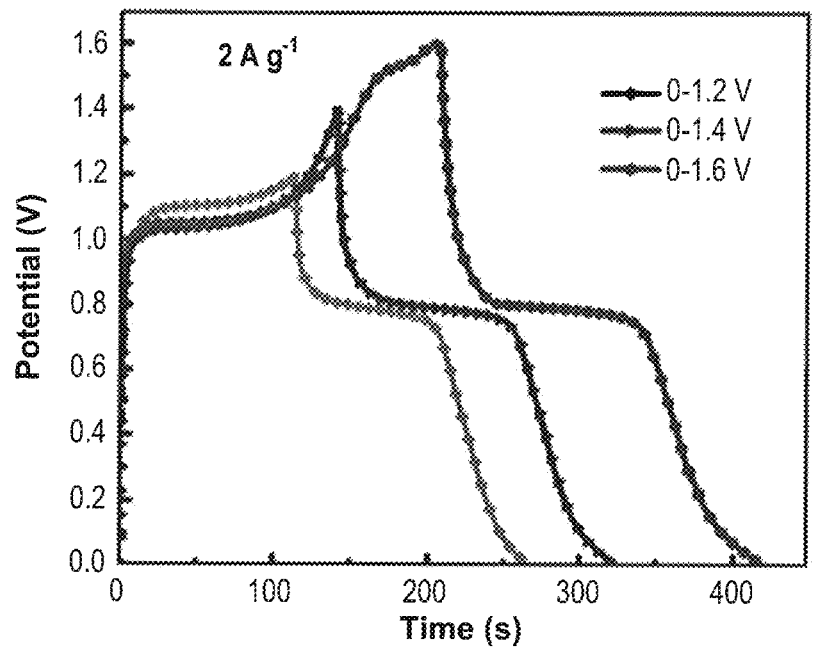
Figure 7D:
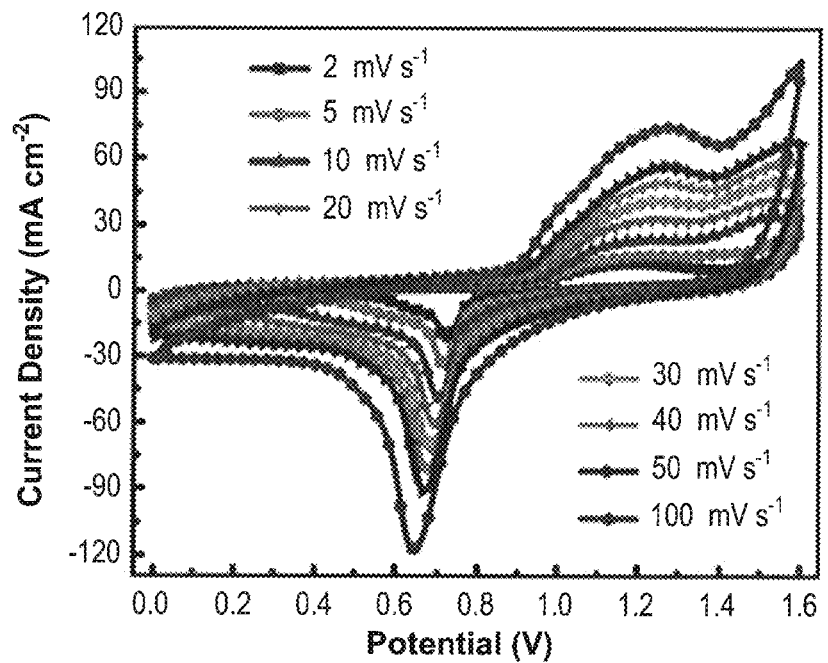
Figure 7E:
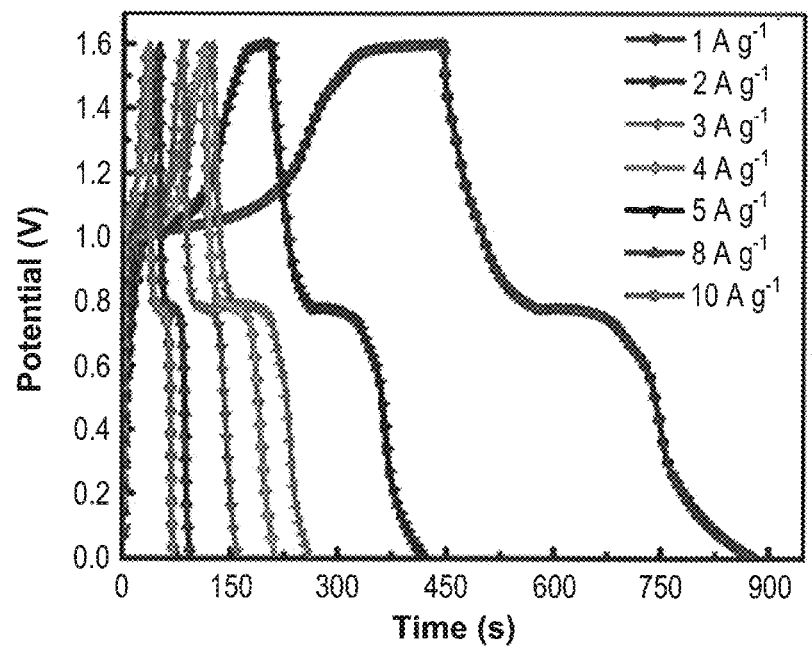
Figure 7F:
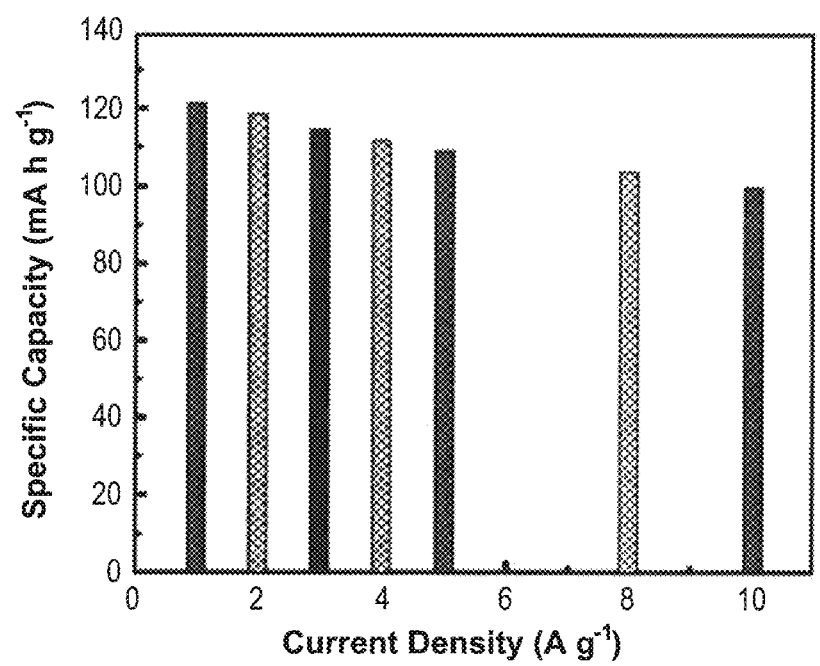
Figure 7G:
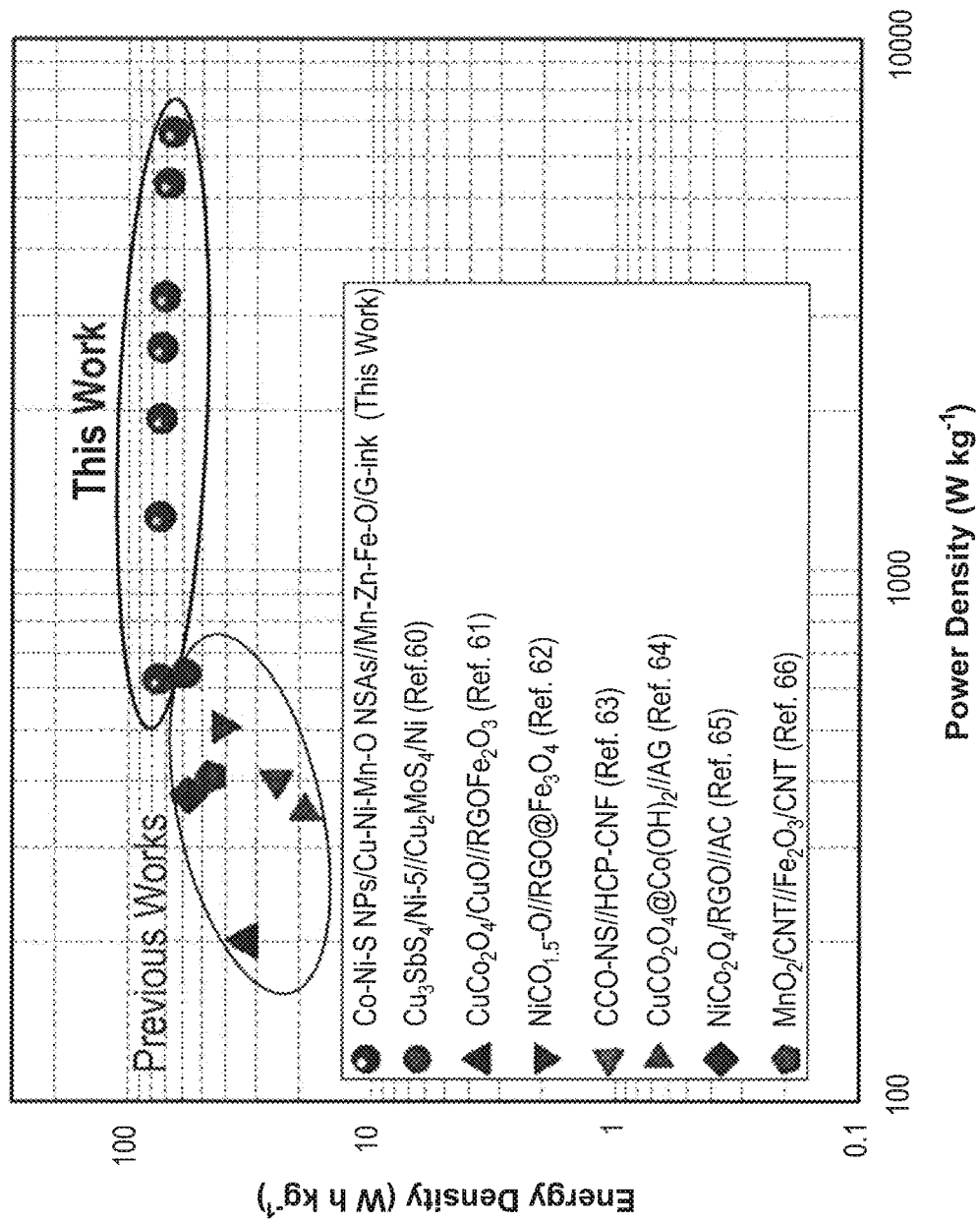
Figure 7H:
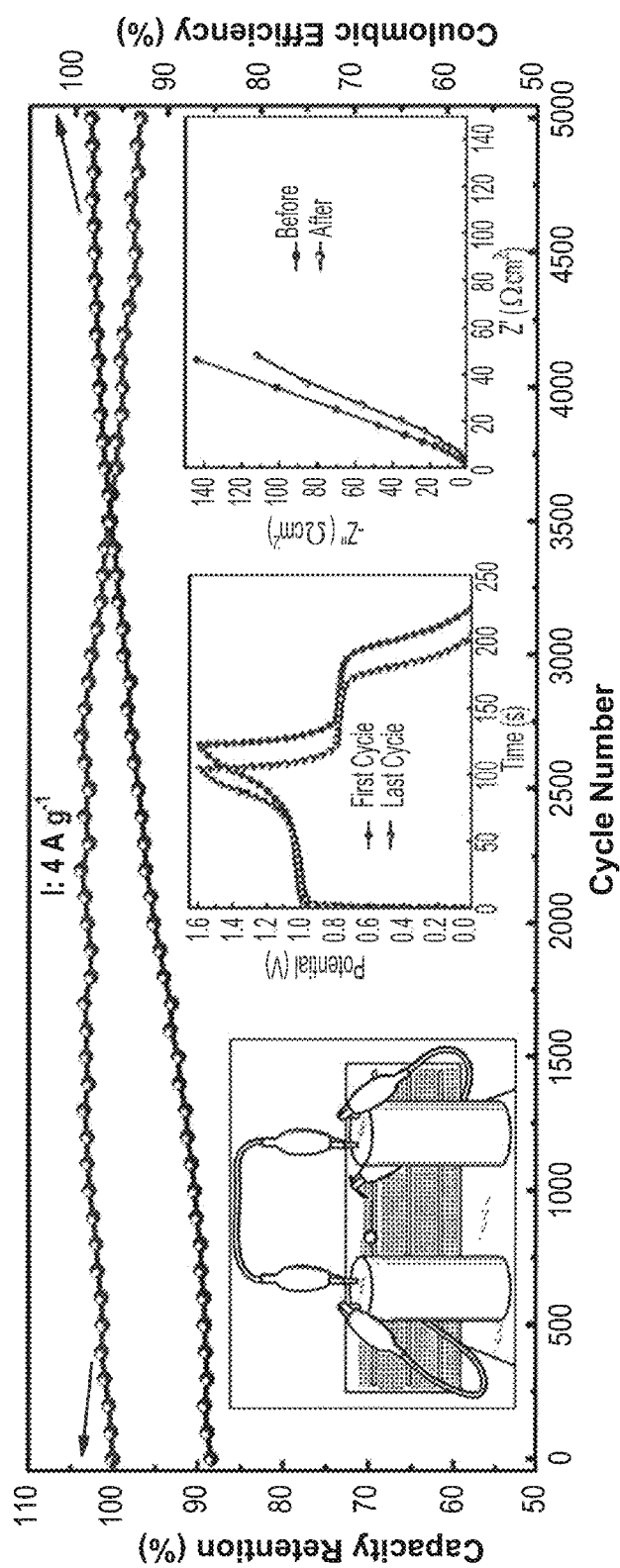

According to the charge balance, the mass ratio of the positive electrode to the negative electrode was found to be ≈2.04 in the exemplary ASC to attain high energy density. A sequence of CV and GCD measurements were performed at various potential windows at 2 mV s$^{-1}$ and 2 A g$^{-1}$ to obtain the best operating potential of the ASC, as depicted in FIGS. 7B-7C. The maximum stable potential window of the ASC can be obtained at 1.6 V. FIG. 7D shows CV curves of the exemplary ASC measured at various scan rates (2 to 100 mV s$^{-1}$) in the operating potential window of 0-1.6 V. The CV curve of the exemplary ASC shows a pair of redox peaks due to reversible Faradaic redox reactions associated with electrolyte ion insertion/extraction, revealing the battery-like Faradaic behavior. No CV shape deviation occurs even at high scan rates, illustrating the outstanding rate capability of the present ASC. Moreover, GCD measurement was conducted to investigate the performance of the exemplary ASC at different current densities in the 0 to 1.6 V potential window, as depicted in FIG. 7E. The charge-discharge profiles indicate that the capacitance due to both the pseudo-capacitive and ion intercalation/deintercalation behavior of the present ASC is consistent with the CV results. FIG. 7F depicts the specific capacity values of the ASC based on the weight of the electroactive materials at different current densities. The Co—Ni—S NPs/Cu—Ni—Mn—O NSAs// Mn—Zn—Fe—O/G-ink ASC device exhibits a specific capacity of 121.51 mA h g$^{-1}$ at 1 A g$^{-1}$, and retains a capacity of 99.72 mA h g$^{-1}$ even at a high current density of 10 A g$^1$, reflecting an excellent rate capability of ASC (82.06%). The EIS plots of the ASC exhibit a negligible change before and after cycling tests (inset of FIG. 7H), revealing excellent cycling stability of the exemplary ASC. For practical applications, the energy and power densities of the exemplary ASC were further evaluated from the GCD plots. As depicted in the Ragone curve of FIG. 7G, the ASC exhibits an energy density of as high as 75.65 W h kg$^{-1}$ at a power density of 622.57 W kg$^{-1}$, which was retained at 66.11 W h kg even at a high power density of 6629.53 W kg$^{-1}$. Besides the excellent specific capacity and rate capability, the remarkable cycling behavior of ASC is crucial for real-time applications. FIG. 7H depicts the cycling stability and columbic efficiency of the Co—Ni—S NPs/Cu—Ni—Mn—O NSAs//Mn—Zn—Fe—O/G-ink ASC device at 4 A g$^{-1}$ for 5000 cycles. The ASC delivers excellent capacity retention of 96.89% and outstanding columbic efficiency of 98.26% over 5000 cycles, indicating its remarkable cycling stability and high reversibility. Furthermore, two serially connected ASC devices lit up a commercial red light-emitting diode (LED) (Inset of FIG. 7H). Thus, owing to the outstanding and unique qualities of the binder-free Co—Ni—S NPs/Cu—Ni—Mn—O NSAs cathode material and Mn—Zn—Fe—O/G-ink anode material of the present ASC, the exemplary ASC device is a viable and promising candidate for use in present and future energy storage systems.

It is to be understood that the asymmetric supercapacitor with hierarchical electrodes are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An asymmetric supercapacitor, comprising: a binder-free cathode comprising a composite metal sulfide in the form of nanoparticles and a composite metal oxide in the form of nanosheet arrays, the nanoparticles being deposited on the nanosheet arrays; and a binder-free anode comprising one or more spinel ferrites deposited on a carbon-based material, the one or more spinel ferrites having the formula MFe$_2$O$_4$; where M is selected from the group consisting of Ca, Mg, Cu, Ni, Zn, Mn; wherein the composite metal sulfide comprises Co$_9$S$_9$—Ni$_3$S$_2$.

2. The asymmetric supercapacitor of claim 1, wherein the composite metal oxide comprises CuMn$_2$O$_4$—NiMn$_2$O$_4$.

3. The asymmetric supercapacitor of claim 1, wherein the one or more spinel ferrites comprise Mn—Zn—Fe—O nanocrystals formed from MnFe$_2$O$_4$ and ZnFe$_2$O$_4$.

4. The asymmetric supercapacitor of claim 1, wherein the carbon-based material comprises graphene-ink.

5. An asymmetric supercapacitor, comprising: a binder-free cathode comprising Co$_9$S$_9$—Ni$_3$S$_2$ in the form of nanoparticles and CuMn$_2$O$_4$—NiMn$_2$O$_4$ in the form of nanosheet arrays, the nanoparticles being deposited on the nanosheet arrays; and a binder-free anode comprising Mn—Zn—Fe—O nanocrystals and a carbon-based material, the Mn—Zn—Fe—O nanocrystals being deposited on the carbon-based material.

6. The asymmetric supercapacitor of claim 5, wherein the carbon-based material comprises graphene-ink.

\* \* \* \* \*